(12) United States Patent
Garthwaite

(10) Patent No.: US 6,868,488 B2
(45) Date of Patent: Mar. 15, 2005

(54) BINNED REMEMBERED SETS

(75) Inventor: Alexander T. Garthwaite, Beverly, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 280 days.

(21) Appl. No.: 10/324,844

(22) Filed: Dec. 20, 2002

(65) Prior Publication Data

US 2004/0123065 A1 Jun. 24, 2004

(51) Int. Cl.[7] .............................................. G06F 12/00
(52) U.S. Cl. ....................... 711/173; 711/136; 711/160; 707/206
(58) Field of Search ................. 711/133–136, 159–160, 711/170–173; 707/1, 100, 200–206

(56) References Cited

PUBLICATIONS

Jones and Lins, "Garbage Collection: Algorithms for Automatic Dynamic Memory Management," 1996, pp. 165–179, Wiley, New York.
Paul Wilson, "Uniprocessor Garbage Collection Techniques," Technical Report, University of Texas, 1994.
Hudson and Moss, "Incremental Collection of Mature Objects," Proceedings of International Workshop on Memory Management, 1992, Springer–Verlag.
Grarup and Seligmann, "Incremental Mature Garbage Collection," M.Sc. Thesis, Available at http://www.daimi.au.dk/~jacobse/Papers/.
Seligmann and Grarup, "Incremental Mature Garbage Collection Using the Train Algorithm," Proceedings of ECOOP '95, Ninth European Conference on Object–Oriented Programming, 1995, http://www.daimi.au.dk/~jacobse/Papers/.
Clark and Mason, "Compacting Garbage Collection can be Fast and Simple," Software–Practice and Experience, Feb. 1996, pp. 177–194, vol. 26, No. 2.
Henry Baker, "List Processing in Real Time on a Serial Computer," Communications of the ACM 21, 4, Apr. 1978, pp. 280–294.
Appel, Ellis, and Li, "Real–time Concurrent Collection on Stock Multiprocessors," ACM SIGPLAN Notices, 1988.
Rodney A. Brooks, "Trading Data Space for Reduced Time and Code Space in Real–Time Garbage Collection on Stock Hardware," Proceedings of the 1984 ACM Symposium on Lisp and Functional Programming, pp. 108–113, Aug. 1984, Austin, Texas.
Herlihy and Moss, "Lock–Free Garbage Collection for Multiprocessors," ACM SPAA, 1991, pp. 229–236.
Bacon, Attanasio, Lee, Rajan, and Smith, "Java without the Coffee Breaks: A Nonintrusive Multiprocessor Garbage Collector," SIGPLAN Conference on Programming Language Design and Implementation, Snowbird, Utah, Jun. 2001.

(List continued on next page.)

Primary Examiner—Nasser Moazzami
(74) Attorney, Agent, or Firm—Kudirka & Jobse, LLP

(57) ABSTRACT

A garbage collector that performs collection incrementally in accordance with the train algorithm employs remembered sets to keep track of locations where references to objects in respective car sections were written. The remembered sets are implemented as multi-level hash tables. The entries in the top-level hash table are pointers to constituent hash tables in which entries representing the reference locations are placed. When a constituent hash table becomes full, the collector thins it by allocating a new constituent table, transferring some of the previously full table's entries to the new table, and dividing further reference-location-representing entries among them in accordance with a hash function having an expanded range.

33 Claims, 26 Drawing Sheets

PUBLICATIONS

James Stamos, "Static Grouping of Small Objects to Enhance Performance of a Paged Virtual Memory," ACM Transactions on Computer Systems, vol. 2, No. 2, pp. 155–180, May 1984.

David A. Moon, "Garbage Collection in a Large Lisp System," Conference Record of the 1984 ACM Symposium on LISP and Functional Programming, Austin, Texas, Aug. 1984, pp. 235–246.

Robert Courts, "Improving Locality of Reference in a Garbage–Collecting Memory Management System," Communications of the ACM, Sep. 1988, pp. 1128–1138, vol. 31, No. 9.

Wilson, Lam, and Moher, "Effective Static–Graph Reorganization to Improve Locality in Garbage Collected Systems," Proceedings of ACM SIGPLAN Conference on Programming Language Design and Implementation, Jun. 1991, Toronto, Ontario, Canada.

Lam, Wilson, and Moher, "Object Type Directed Garbage Collection to Improve Locality," Proceedings of the International Workshop on Memory Management '92, St. Malo, France, Sep. 1992, pp. 404–425.

Chilimbi and Larus, "Using Generational Garbage Collection to Implement Cache–Conscious Data Placement," International Symposium on Memory Management, Oct. 1998.

Lieberman and Hewitt, "A real–time garbage collector based on the lifetimes of objects," Communications of the ACM, 1983, pp. 419–429, vol. 26, No. 6.

David Ungar, "Generation Scavenging: A Non–Disruptive High Performance Storage Reclamation Algorithm," ACM SIGPLAN Notices, Apr. 1984, pp. 157–167, vol. 19, No. 5.

Andrew W. Appel, "Simple Generational Garbage Collection and Fast Allocation," Software Practice and Experience, 1989, pp. 171–183, vol. 19, No. 2.

Hudson and Diwan, "Adaptive Garbage Collection for Modula–3 and Smalltalk," in OOPSLA/ECOOP Workshop on Garbage Collection in Object–Oriented Systems, Oct. 1990, Edited by Eric Jul and Niels–Cristial Juul.

Hudson and Hosking, "Remembered sets can also play cards," in OOPSLA/ECOOP Workshop on Garbage Collection in Object–Oriented Systems, Oct. 1993, Edited by Moss, Wilson, and Zorn.

Hosking and Moss, "Protection traps and alternatives for memory management of an object–oriented language," ACM Proceedings of the Fourteenth ACM Symposium on Operating Systems Principles, Dec. 1993, pp. 106–119, vol. 27, No. 5.

Hosking, Moss, and Stefanovic, "A Comparative Performance Evaluation of Write Barrier Implementation," in OOPSLA ACM Conference on Object–Oriented Programming, Systems, Languages, and Applications, Oct. 1992, pp. 92–109, vol. 27, No. 10, ACM SIGPLAN Notices, Vancouver, BC, ACM Press.

Patrick G. Sobalvarro, "A Lifetime–based Garbage Collector for LISP Systems on General–Purpose Computers," Massachusetts Institute of Technology, AITR–1417, 1988.

BINNED REMEMBERED SETS

BACKGROUND OF THE INVENTION

1. Field of the Invention

The present invention is directed to memory management. It particularly concerns what has come to be known as "garbage collection."

2. Background Information

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

The invention to be described below is applicable to systems that allocate memory to objects dynamically. Not all systems employ dynamic allocation. In some computer languages, source programs must be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data, and instructions for operating on them, that a microprocessor 11 uses may reside in on-board cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17.

Additionally, the actual physical operations performed to access some of the most-recently visited parts of the process's address space often will actually be performed in the cache 12 or in a cache on board microprocessor 11 rather than on the RAM 14, with which those caches swap data and instructions just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Despite these expedients, the use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak."

Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Explicit dynamic-memory management by using interfaces like malloc( )/free( ) often leads to these problems.

A way of reducing the likelihood of such leaks and related errors is to provide memory-space reclamation in a more-automatic manner. Techniques used by systems that reclaim memory space automatically are commonly referred to as "garbage collection." Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a "root set," e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage-collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 20. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling. The electrical signals that carry the digital data by which the computer systems exchange that code are examples of the kinds of electromagnetic signals by which the computer instructions can be communicated. Others are radio waves, microwaves, and both visible and invisible light.

The input to the compiler is the application source code, and the end product of the compiler process is application object code. This object code defines an application 21, which typically operates on input such as mouse clicks, etc., to generate a display or some other type of output. This object code implements the relationship that the programmer intends to specify by his application source code. In one approach to garbage collection, the compiler 20, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage-collection mechanism over a number of computer-system layers.

To get some sense of the variety of system components that can be used to implement garbage collection, consider FIG. 3's example of a more complex way in which various levels of source code can result in the machine instructions that a processor executes. In the FIG. 3 arrangement, the human applications programmer produces source code 22 written in a high-level language. A compiler 23 typically converts that code into "class files." These files include routines written in instructions, called "byte codes" 24, for a "virtual machine" that various processors can be software-configured to emulate. This conversion into byte codes is almost always separated in time from those codes' execution, so FIG. 3 divides the sequence into a "compile-time environment" 25 separate from a "run-time environment" 26, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 27. That process emulates a virtual machine from whose instruction set the byte codes are drawn. As is true of the compiler 23, the virtual-machine process 27 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine, in which case the code would be transmitted electrically or optically to the virtual-machine-implementing processor.

In some implementations, much of the virtual machine's action in executing these byte codes is most like what those skilled in the art refer to as "interpreting," so FIG. 3 depicts the virtual machine as including an "interpreter" 28 for that purpose. In addition to or instead of running an interpreter, many virtual-machine implementations actually compile the byte codes concurrently with the resultant object code's execution, so FIG. 3 depicts the virtual machine as additionally including a "just-in-time" compiler 29. We will refer to the just-in-time compiler and the interpreter together as "execution engines" since they are the methods by which byte code can be executed.

Now, some of the functionality that source-language constructs specify can be quite complicated, requiring many machine-language instructions for their implementation. One quite-common example is a source-language instruction that calls for 64-bit arithmetic on a 32-bit machine. More germane to the present invention is the operation of dynamically allocating space to a new object; the allocation of such objects must be mediated by the garbage collector.

In such situations, the compiler may produce "inline" code to accomplish these operations. That is, all object-code instructions for carrying out a given source-code-prescribed operation will be repeated each time the source code calls for the operation. But inlining runs the risk that "code bloat" will result if the operation is invoked at many source-code locations.

The natural way of avoiding this result is instead to provide the operation's implementation as a procedure, i.e., a single code sequence that can be called from any location in the program. In the case of compilers, a collection of procedures for implementing many types of source-code-specified operations is called a runtime system for the language. The execution engines and the runtime system of a virtual machine are designed together so that the engines "know" what runtime-system procedures are available in the virtual machine (and on the target system if that system provides facilities that are directly usable by an executing virtual-machine program.) So, for example, the just-in-time compiler 29 may generate native code that includes calls to memory-allocation procedures provided by the virtual machine's runtime system. These allocation routines may in turn invoke garbage-collection routines of the runtime system when there is not enough memory available to satisfy an allocation. To represent this fact, FIG. 3 includes block 30 to show that the compiler's output makes calls to the runtime system as well as to the operating system 31, which consists of procedures that are similarly system-resident but are not compiler-dependent.

Although the FIG. 3 arrangement is a popular one, it is by no means universal, and many further implementation types can be expected. Proposals have even been made to implement the virtual machine 27's behavior in a hardware processor, in which case the hardware itself would provide some or all of the garbage-collection function.

The arrangement of FIG. 3 differs from FIG. 2 in that the compiler 23 for converting the human programmer's code does not contribute to providing the garbage-collection function; that results largely from the virtual machine 27's operation. Those skilled in that art will recognize that both of these organizations are merely exemplary, and many modem systems employ hybrid mechanisms, which partake of the characteristics of traditional compilers and traditional interpreters both.

The invention to be described below is applicable independently of whether a batch compiler, a just-in-time compiler, an interpreter, or some hybrid is employed to process source code. In the remainder of this application, therefore, we will use the term compiler to refer to any such mechanism, even if it is what would more typically be called an interpreter.

In short, garbage collectors can be implemented in a wide range of combinations of hardware and/or software. As is true of most of the garbage-collection techniques described in the literature, the invention to be described below is applicable to most such systems.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity.

Some garbage-collection approaches rely heavily on interleaving garbage-collection steps among mutator steps. In one type of garbage-collection approach, for instance, the mutator operation of writing a reference is followed immediately by garbage-collector steps used to maintain a reference count in that object's header, and code for subsequent new-object storage includes steps for finding space occupied by objects whose reference count has fallen to zero. Obviously, such an approach can slow mutator operation significantly.

Other approaches therefore interleave very few garbage-collector-related instructions into the main mutator process but instead interrupt it from time to time to perform garbage-collection cycles, in which the garbage collector finds unreachable objects and reclaims their memory space for reuse. Such an approach will be assumed in discussing FIG. 4's depiction of a simple garbage-collection operation. Within the memory space allocated to a given application is a part 40 managed by automatic garbage collection. In the following discussion, this will be referred to as the "heap," although in other contexts that term refers to all dynamically allocated memory. During the course of the application's execution, space is allocated for various objects 42, 44, 46, 48, and 50. Typically, the mutator allocates space within the heap by invoking the garbage collector, which at some level manages access to the heap. Basically, the mutator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to, as object 42 is, by a reference in the root set 52. The root set consists of reference values stored in the mutator's threads' call stacks, the CPU registers, and global variables outside the garbage-collected heap. An object is also reachable if it is referred to, as object 46 is, by another reachable object (in this case, object 42). Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing references from the root set 52. For the sake of simplicity, FIG. 4 depicts only one reference from the root set 52 into the heap 40. (Those skilled in the art will recognize that there are many ways to identify references, or at least data contents that may be references.) The collector notes that the root set points to object 42, which is therefore reachable, and that reachable object 42 points to object 46, which therefore is also reachable. But those reachable objects point to no other objects, so objects 44, 48, and 50 are all unreachable, and their memory space may be reclaimed. This may involve, say, placing that memory space in a list of free memory blocks.

To avoid excessive heap fragmentation, some garbage collectors additionally relocate reachable objects. FIG. 5 shows a typical approach. The heap is partitioned into two halves, hereafter called "semi-spaces." For one garbage-collection cycle, all objects are allocated in one semi-space 54, leaving the other semi-space 56 free. When the garbage-collection cycle occurs, objects identified as reachable are "evacuated" to the other semi-space 56, so all of semi-space 54 is then considered free. Once the garbage-collection cycle has occurred, all new objects are allocated in the lower semi-space 56 until yet another garbage-collection cycle occurs, at which time the reachable objects are evacuated back to the upper semi-space 54.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

Now, a collection cycle can involve following all reference chains from the basic root set—i.e., from inherently reachable locations such as the call stacks, class statics and other global variables, and registers—and reclaiming all space occupied by objects not encountered in the process. And the simplest way of performing such a cycle is to interrupt the mutator to provide a collector interval in which the entire cycle is performed before the mutator resumes. For certain types of applications, this approach to collection-cycle scheduling is acceptable and, in fact, highly efficient.

For many interactive and real-time applications, though, this approach is not acceptable. The delay in mutator operation that the collection cycle's execution causes can be annoying to a user and can prevent a real-time application from responding to its environment with the required speed. In some applications, choosing collection times opportunistically can reduce this effect. Collection intervals can be inserted when an interactive mutator reaches a point at which it awaits user input, for instance.

So it may often be true that the garbage-collection operation's effect on performance can depend less on the total collection time than on when collections actually occur. But another factor that often is even more determinative is the duration of any single collection interval, i.e., how long the mutator must remain quiescent at any one time. In an interactive system, for instance, a user may never notice hundred-millisecond interruptions for garbage collection, whereas most users would find interruptions lasting for two seconds to be annoying.

The cycle may therefore be divided up among a plurality of collector intervals. When a collection cycle is divided up among a plurality of collection intervals, it is only after a number of intervals that the collector will have followed all reference chains and be able to identify as garbage any objects not thereby reached. This approach is more complex than completing the cycle in a single collection interval; the mutator will usually modify references between collection intervals, so the collector must repeatedly update its view of the reference graph in the midst of the collection cycle. To make such updates practical, the mutator must communicate with the collector to let it know what reference changes are made between intervals.

An even more complex approach, which some systems use to eliminate discrete pauses or maximize resource-use efficiency, is to execute the mutator and collector in concurrent execution threads. Most systems that use this approach use it for most but not all of the collection cycle; the mutator is usually interrupted for a short collector interval, in which a part of the collector cycle takes place without mutation.

Independent of whether the collection cycle is performed concurrently with mutator operation, is completed in a single interval, or extends over multiple intervals is the question of whether the cycle is complete, as has tacitly been assumed so far, or is instead "incremental." In incremental collection, a collection cycle constitutes only an increment of collection: the collector does not follow all reference chains from the basic root set completely. Instead, it concentrates on only a portion, or collection set, of the heap. Specifically, it identifies every collection-set object referred to by a reference chain that extends into the collection set from outside of it, and it reclaims the collection-set space not occupied by such objects, possibly after evacuating them from the collection set.

By thus culling objects referenced by reference chains that do not necessarily originate in the basic root set, the collector can be thought of as expanding the root set to include as roots some locations that may not be reachable. Although incremental collection thereby leaves "floating garbage," it can result in relatively low pause times even if entire collection increments are completed during respective single collection intervals.

Most collectors that employ incremental collection operate in "generations," although this is not necessary in principle. Different portions, or generations, of the heap are subject to different collection policies. New objects are allocated in a "young" generation, and older objects are promoted from younger generations to older or more "mature" generations. Collecting the younger generations more frequently than the others yields greater efficiency because the younger generations tend to accumulate garbage faster; newly allocated objects tend to "die," while older objects tend to "survive."

But generational collection greatly increases what is effectively the root set for a given generation. Consider FIG. 6, which depicts a heap as organized into three generations 58, 60, and 62. Assume that generation 60 is to be collected. The process for this individual generation may be more or less the same as that described in connection with FIGS. 4 and 5 for the entire heap, with one major exception. In the case of a single generation, the root set must be considered to include not only the call stack, registers, and global variables represented by set 52 but also objects in the other generations 58 and 62, which themselves may contain references to objects in generation 60. So pointers must be traced not only from the basic root set 52 but also from objects within the other generations.

One could perform this tracing by simply inspecting all references in all other generations at the beginning of every collection interval, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation to record information from which the collector can determine where references were written or may have been since the last collection interval. A reference list can then be maintained by taking such a list as it existed at the end of the previous collection interval and updating it by inspecting only locations identified by the write barrier as possibly modified since the last collection interval.

One of the many write-barrier implementations commonly used by workers in this art employs what has been referred to as the "card table." FIG. 6 depicts the various generations as being divided into smaller sections, known for this purpose as "cards." Card tables 64, 66, and 68 associated with respective generations contain an entry for each of their cards. When the mutator writes a reference in a card, it makes an appropriate entry in the card-table location associated with that card (or, say, with the card in which the object containing the reference begins). Most write-barrier implementations simply make a Boolean entry indicating that the write operation has been performed, although some may be more elaborate. The mutator having thus left a record of where new or modified references may be, the collector can thereafter prepare appropriate summaries of that information, as will be explained in due course. For the sake of concreteness, we will assume that the summaries are maintained by steps that occur principally at the beginning of each collection interval.

Of course, there are other write-barrier approaches, such as simply having the write barrier add to a list of addresses where references where written. Also, although there is no reason in principle to favor any particular number of generations, and although FIG. 6 shows three, most generational garbage collectors have only two generations, of which one is the young generation and the other is the mature generation. Moreover, although FIG. 6 shows the generations as being of the same size, a more-typical configuration is for the young generation to be considerably smaller. Finally, although we assumed for the sake of simplicity that collection during a given interval was limited to only one generation, a more-typical approach is actually to collect the whole young generation at every interval but to collect the mature one less frequently.

Some collectors collect the entire young generation in every interval and may thereafter perform mature-generation collection in the same interval. It may therefore take relatively little time to scan all young-generation objects remaining after young-generation collection to find references into the mature generation. Even when such collectors do use card tables, therefore, they often do not use them for finding young-generation references that refer to mature-generation objects. On the other hand, laboriously scanning the entire mature generation for references to young-generation (or mature-generation) objects would ordinarily take too long, so the collector uses the card table to limit the amount of memory it searches for mature-generation references.

Now, although it typically takes very little time to collect the young generation, it may take more time than is acceptable within a single garbage-collection cycle to collect the entire mature generation. So some garbage collectors may collect the mature generation incrementally; that is, they may perform only a part of the mature generation's collection during any particular collection cycle. Incremental collection presents the problem that, since the generation's unreachable objects outside the "collection set" of objects processed during that cycle cannot be recognized as unreachable, collection-set objects to which they refer tend not to be, either.

To reduce the adverse effect this would otherwise have on collection efficiency, is workers in this field have employed the "train algorithm," which FIG. 7 depicts. A generation to be collected incrementally is divided into sections, which for reasons about to be described are referred to as "car sections." Conventionally, a generation's incremental collection occurs in fixed-size sections, and a car section's size is that of the generation portion to be collected during one cycle.

The discussion that follows will occasionally employ the nomenclature in the literature by using the term car instead of car section. But the literature seems to use that term to refer variously not only to memory sections themselves but also to data structures that the train algorithm employs to manage them when they contain objects, as well as to the more-abstract concept that the car section and managing data structure represent in discussions of the algorithm. So the following discussion will more frequently use the expression car section to emphasize the actual sections of memory space for whose management the car concept is employed.

According to the train algorithm, the car sections are grouped into "trains," which are ordered, conventionally according to age. For example, FIG. 7 shows an oldest train 73 consisting of a generation 74's three car sections described by associated data structures 75, 76, and 78, while a second train 80 consists only of a single car section, represented by structure 82, and the youngest train 84 (referred to as the "allocation train") consists of car sections that data structures 86 and 88 represent. As will be seen below, car sections' train memberships can change, and any car section added to a train is typically added to the end of a train.

Conventionally, the car collected in an increment is the one added earliest to the oldest train, which in this case is car 75. All of the generation's cars can thus be thought of as waiting for collection in a single long line, in which cars are ordered in accordance with the order of the trains to which they belong and, within trains, in accordance with the order in which they were added to those trains.

As is usual, the way in which reachable objects are identified is to determine whether there are references to them in the root set or in any other object already determined to be reachable. In accordance with the train algorithm, the collector additionally performs a test to determine whether there are any references at all from outside the oldest train to objects within it. If there are not, then all cars within the train can be reclaimed, even though not all of those cars are in the collection set. And the train algorithm so operates that inter-car references tend to be grouped into trains, as will now be explained.

To identify references into the car from outside of it, train-algorithm implementations typically employ "remembered sets." As card tables are, remembered sets are used to keep track of references. Whereas a card-table entry contains information about references that the associated card contains, though, a remembered set associated with a given region contains information about references into that region from locations outside of it. In the case of the train algorithm, remembered sets are associated with car sections. Each remembered set, such as car 75's remembered set 90, lists locations in the generation that contain references into the associated car section.

The remembered sets for all of a generation's cars are typically updated at the start of each collection cycle. To illustrate how such updating and other collection operations may be carried out, FIGS. 8A and 8B (together, "FIG. 8") depict an operational sequence in a system of the typical type mention above. That is, it shows a sequence of operations that may occur in a system in which the entire garbage-collected heap is divided into two generations, namely, a young generation and an old generation, and in which the young generation is much smaller than the old generation. FIG. 8 is also based on the assumption and that the train algorithm is used only for collecting the old generation.

Block 102 represents a period of the mutator's operation. As was explained above, the mutator makes a card-table entry to identify any card that it has "dirtied" by adding or modifying a reference that the card contains. At some point, the mutator will be interrupted for collector operation. Different implementations employ different events to trigger such an interruption, but we will assume for the sake of concreteness that the system's dynamic-allocation routine causes such interruptions when no room is left in the young generation for any further allocation. A dashed line 103 represents the transition from mutator operation and collector operation.

In the system assumed for the FIG. 8 example, the collector collects the (entire) young generation each time such an interruption occurs. When the young generation's collection ends, the mutator operation usually resumes, without the collector's having collected any part of the old generation. Once in a while, though, the collector also collects part of the old generation, and FIG. 8 is intended to illustrate such an occasion.

When the collector's interval first starts, it first processes the card table, in an operation that block 104 represents. As was mentioned above, the collector scans the "dirtied" cards for references into the young generation. If a reference is found, that fact is memorialized appropriately. If the reference refers to a young-generation object, for example, an expanded card table may be used for this purpose. For each card, such an expanded card table might include a multi-byte array used to summarize the card's reference contents. The summary may, for instance, be a list of offsets that indicate the exact locations within the card of references to young-generation objects, or it may be a list of fine-granularity "sub-cards" within which references to young-generation objects may be found. If the reference refers to an old-generation object, the collector often adds an entry to the remembered set associated with the car containing that old-generation object. The entry identifies the reference's location, or at least a small region in which the reference can be found. For reasons that will become apparent, though, the collector will typically not bother to place in the remembered set the locations of references from objects in car sections farther forward in the collection queue than the referred-to object, i.e., from objects in older trains or in cars added earlier to the same train.

The collector then collects the young generation, as block 105 indicates. (Actually, young-generation collection may be interleaved with the dirty-region scanning, but the drawing illustrates it for purpose of explanation as being separate.) If a young-generation object is referred to by a reference that card-table scanning has revealed, that object is considered to be potentially reachable, as is any young-generation object referred to by a reference in the root set or in another reachable young-generation object. The space occupied by any young-generation object thus considered reachable is withheld from reclamation. For example, it may be evacuated to a young-generation semi-space that will be used for allocation during the next mutator interval. It may instead be promoted into the older generation, where it is placed into a car containing a reference to it or into a car in the last train. Or some other technique may be used to keep the memory space it occupies off the system's free list. The collector then reclaims any young-generation space occupied by any other objects, i.e., by any young-generation objects not identified as transitively reachable through references located outside the young generation.

The collector then performs the train algorithm's central test, referred to above, of determining whether there are any references into the oldest train from outside of it. As was mentioned above, the actual process of determining, for each object, whether it can be identified as unreachable is performed for only a single car section in any cycle. In the absence of features such as those provided by the train algorithm, this would present a problem, because garbage structures may be larger than a car section. Objects in such structures would therefore (erroneously) appear reachable, since they are referred to from outside the car section under consideration. But the train algorithm additionally keeps track of whether there are any references into a given car from outside the train to which it belongs, and trains' sizes are not limited. As will be apparent presently, objects not found to be unreachable are relocated in such a way that garbage structures tend to be gathered into respective trains into which, eventually, no references from outside the train point. If no references from outside the train point to any objects inside the train, the train can be recognized as containing only garbage. This is the test that block 106 represents. All cars in a train thus identified as containing only garbage can be reclaimed.

The question of whether old-generation references point into the train from outside of it is (conservatively) answered in the course of updating remembered sets; in the course of updating a car's remembered set, it is a simple matter to flag the car as being referred to from outside the train. The step-106 test additionally involves determining whether any references from outside the old generation point into the oldest train. Various approaches to making this determination have been suggested, including the conceptually simple approach of merely following all reference chains from the root set until those chains (1) terminate, (2) reach an old-generation object outside the oldest train, or (3) reach an object in the oldest train. In the two-generation example, most of this work can be done readily by identifying references into the collection set from live young-generation objects during the young-generation collection. If one or more such chains reach the oldest train, that train includes reachable objects. It may also include reachable objects if the remembered-set-update operation has found one or more references into the oldest train from outside of it. Otherwise, that train contains only garbage, and the collector reclaims all of its car sections for reuse, as block 107 indicates. The collector may then return control to the mutator, which resumes execution, as FIG. 8B's block 108 indicates.

If the train contains reachable objects, on the other hand, the collector turns to evacuating potentially reachable objects from the collection set. The first operation, which block 110 represents, is to remove from the collection set any object that is reachable from the root set by way of a reference chain that does not pass through the part of the old generation that is outside of the collection set. In the illustrated arrangement, in which there are only two generations, and the young generation has previously been completely collected during the same interval, this means evacuating from a collection set any object that (1) is directly referred to by a reference in the root set, (2) is directly referred to by a reference in the young generation (in which no remaining objects have been found unreachable), or (3) is referred to by any reference in an object thereby evacuated. All of the objects thus evacuated are placed in cars in the youngest train, which was newly created during the collection cycle. Certain of the mechanics involved in the evacuation process are described in more detail in connection with similar evacuation performed, as blocks 112 and 114 indicate, in response to remembered-set entries.

FIG. 9 illustrates how the processing represented by block 114 proceeds. The entries identify heap regions, and, as block 116 indicates, the collector scans the thus-identified heap regions to find references to locations in the collection-set. As blocks 118 and 120 indicate, that entry's processing continues until the collector finds no more such references. Every time the collector does find such a reference, it checks to determine whether, as a result of a previous entry's processing, the referred-to object has already is been evacuated. If it has not, the collector evacuates the referred-to object to a (possibly new) car in the train containing the reference, as blocks 122 and 124 indicate.

As FIG. 10 indicates, the evacuation operation includes more than just object relocation, which block 126 represents. Once the object has been moved, the collector places a forwarding pointer in the collection-set location from which it was evacuated, for a purpose that will become apparent presently. Block 128 represents that step. (Actually, there are some cases in which the evacuation is only a "logical" evacuation: the car containing the object is simply re-linked to a different logical place in the collection sequence, but its address does not change. In such cases, forwarding pointers are unnecessary.) Additionally, the reference in response to which the object was evacuated is updated to point to the evacuated object's new location, as block 130 indicates. And, as block 132 indicates, any reference contained in the evacuated object is processed, in an operation that FIGS. 11A and 11B (together, "FIG. 11") depict.

For each one of the evacuated object's references, the collector checks to see whether the location that it refers to is in the collection set. As blocks 134 and 136 indicate, the reference processing continues until all references in the evacuated object have been processed. In the meantime, if a reference refers to a collection-set location that contains an object not yet evacuated, the collector evacuates the referred-to object to the train to which the evacuated object containing the reference was evacuated, as blocks 138 and 140 indicate.

If the reference refers to a location in the collection set from which the object has already been evacuated, then the collector uses the forwarding pointer left in that location to update the reference, as block 142 indicates. Before the processing of FIG. 11, the remembered set of the referred-to object's car will have an entry that identifies the evacuated object's old location as one containing a reference to the referred-to object. But the evacuation has placed the reference in a new location, for which the remembered set of the referred-to object's car may not have an entry. So, if that new location is not as far forward as the referred-to object, the collector adds to that remembered set an entry identifying the reference's new region, as blocks 144 and 146 indicate. As the drawings show, the same type of remembered-set update is performed if the object referred to by the evacuated reference is not in the collection set.

Now, some train-algorithm implementations postpone processing of the references contained in evacuated collection-set objects until after all directly reachable collection-set objects have been evacuated. In the implementation that FIG. 10 illustrates, though, the processing of a given evacuated object's references occurs before the next object is evacuated. So FIG. 11's blocks 134 and 148 indicate that the FIG. 11 operation is completed when all of the references contained in the evacuated object have been processed. This completes FIG. 10's object-evacuation operation, which FIG. 9's block 124 represents.

As FIG. 9 indicates, each collection-set object referred to by a reference in a remembered-set-entry-identified location is thus evacuated if it has not been already. If the object has already been evacuated from the referred-to location, the reference to that location is updated to point to the location to which the object has been evacuated. If the remembered set associated with the car containing the evacuated object's new location does not include an entry for the reference's location, it is updated to do so if the car containing the reference is younger than the car containing the evacuated object. Block 150 represents updating the reference and, if necessary, the remembered set.

As FIG. 8's blocks 112 and 114 indicate, this processing of collection-set remembered sets is performed initially only for entries that do not refer to locations in the oldest train. Those that do are processed only after all others have been, as blocks 152 and 154 indicate.

When this process has been completed, the collection set's memory space can be reclaimed, as block 164 indicates, since no remaining object is referred to from outside the collection set: any remaining collection-set object is unreachable. The collector then relinquishes control to the mutator.

FIGS. 12A–12J illustrate results of using the train algorithm. FIG. 12A represents a generation in which objects have been allocated in nine car sections. The oldest train has four cars, numbered 1.1 through 1.4. Car 1.1 has two objects, A and B. There is a reference to object B in the root set (which, as was explained above, includes live objects in the other generations). Object A is referred to by object L, which is in the third train's sole car section. In the generation's remembered sets 170, a reference in object L has therefore been recorded against car 1.1.

Processing always starts with the oldest train's earliest-added car, so the garbage collector refers to car 1.1's remembered set and finds that there is a reference from object L into the car being processed. It accordingly evacuates object A to the train that object L occupies. The object being evacuated is often placed in one of the selected train's existing cars, but we will assume for present purposes that there is not enough room. So the garbage collector evacuates object A into a new car section and updates appropriate data structures to identify it as the next car in the third train. FIG. 12B depicts the result: a new car has been added to the third train, and object A is placed in it.

FIG. 12B also shows that object B has been evacuated to a new car outside the first train. This is because object B has an external reference, which, like the reference to object A, is a reference from outside the first train, and one goal of the processing is to form trains into which there are no further references. Note that, to maintain a reference to the same object, object L's reference to object A has had to be rewritten, and so have object B's reference to object A and the inter-generational pointer to object B. In the illustrated example, the garbage collector begins a new train for the car into which object B is evacuated, but this is not a necessary requirement of the train algorithm. That algorithm requires only that externally referenced objects be evacuated to a newer train.

Since car 1.1 no longer contains live objects, it can be reclaimed, as FIG. 12B also indicates. Also note that the remembered set for car 2.1 now includes the address of a reference in object A, whereas it did not before. As was stated before, remembered sets in the illustrated embodiment include only references from cars further back in the order than the one with which the remembered set is associated. The reason for this is that any other cars will already be reclaimed by the time the car associated with that remembered set is processed, so there is no reason to keep track of references from them.

The next step is to process the next car, the one whose index is 1.2. Conventionally, this would not occur until some collection cycle after the one during which car 1.1 is collected. For the sake of simplicity we will assume that the mutator has not changed any references into the generation in the interim.

FIG. 12B depicts car 1.2 as containing only a single object, object C, and that car's remembered set contains the address of an inter-car reference from object F. The garbage collector follows that reference to object C. Since this identifies object C as possibly reachable, the garbage collector evacuates it from car set 1.2, which is to be reclaimed. Specifically, the garbage collector removes object C to a new car section, section 1.5, which is linked to the train to which the referring object F's car belongs. Of course, object F's reference needs to be updated to object C's new location. FIG. 12C depicts the evacuation's result.

FIG. 12C also indicates that car set 1.2 has been reclaimed, and car 1.3 is next to be processed. The only address in car 1.3's remembered set is that of a reference in object G. Inspection of that reference reveals that it refers to object F. Object F may therefore be reachable, so it must be evacuated before car section 1.3 is reclaimed. On the other hand, there are no references to objects D and E, so they are clearly garbage. FIG. 12D depicts the result of reclaiming car 1.3's space after evacuating possibly reachable object F.

In the state that FIG. 12D depicts, car 1.4 is next to be processed, and its remembered set contains the addresses of references in objects K and C. Inspection of object K's reference reveals that it refers to object H, so object H must be evacuated. Inspection of the other remembered-set entry, the reference in object C, reveals that it refers to object G, so that object is evacuated, too. As FIG. 12E illustrates, object H must be added to the second train, to which its referring object K belongs. In this case there is room enough in car 2.2, which its referring object K occupies, so evacuation of object H does not require that object K's reference to object H be added to car 2.2's remembered set. Object G is evacuated to a new car in the same train, since that train is where referring object C resides. And the address of the reference in object G to object C is added to car 1.5's remembered set.

FIG. 12E shows that this processing has eliminated all references into the first train, and it is an important part of the train algorithm to test for this condition. That is, even though there are references into both of the train's cars, those cars' contents can be recognized as all garbage because there are no references into the train from outside of it. So all of the first train's cars are reclaimed.

The collector accordingly processes car 2.1 during the next collection cycle, and that car's remembered set indicates that there are two references outside the car that refer to objects within it. Those references are in object K, which is in the same train, and object A, which is not. Inspection of those references reveals that they refer to objects I and J, which are evacuated.

The result, depicted in FIG. 12F, is that the remembered sets for the cars in the second train reveal no inter-car references, and there are no inter-generational references into it, either. That train's car sections therefore contain only garbage, and their memory space can be reclaimed.

So car 3.1 is processed next. Its sole object, object L, is referred to inter-generationally as well as by a reference in the fourth train's object M. As FIG. 12G shows, object L is therefore evacuated to the fourth train. And the address of the reference in object L to object A is placed in the remembered set associated with car 3.2, in which object A resides.

The next car to be processed is car 3.2, whose remembered set includes the addresses of references into it from objects B and L. Inspection of the reference from object B reveals that it refers to object A, which must therefore be evacuated to the fifth train before car 3.2 can be reclaimed. Also, we assume that object A cannot fit in car to section 5.1, so a new car 5.2 is added to that train, as FIG. 12H shows, and object A is placed in its car section. All referred-to objects in the third train having been evacuated, that (single-car) train can be reclaimed in its entirety.

A further observation needs to be made before we leave FIG. 12G. Car 3.2's remembered set additionally lists a reference in object L, so the garbage collector inspects that reference and finds that it points to the location previously occupied by object A. This brings up a feature of copying-collection techniques such as the typical train-algorithm implementation. When the garbage collector evacuates an object from a car section, it marks the location as having been evacuated and leaves the address of the object's new location. So, when the garbage collector traces the reference from object L, it finds that object A has been removed, and it accordingly copies the new location into object L as the new value of its reference to object A.

In the state that FIG. 12H illustrates, car 4.1 is the next to be processed. Inspection of the fourth train's remembered sets reveals no inter-train references into it, but the inter-generational scan (possibly performed with the aid of FIG. 6's card tables) reveals inter-generational references into car 4.2. So the fourth train cannot be reclaimed yet. The garbage collector accordingly evacuates car 4.1's referred-to objects in the normal manner, with the result that FIG. 12I depicts.

In that state, the next car to be processed has only inter-generational references into it. So, although its referred-to objects must therefore be evacuated from the train, they cannot be placed into trains that contain references to them. Conventionally, such objects are evacuated to a train at the end of the train sequence. In the illustrated implementation, a new train is formed for this purpose, so the result of car 4.2's processing is the state that FIG. 12J depicts.

Processing continues in this same fashion. Of course, subsequent collection cycles will not in general proceed, as in the illustrated cycles, without any reference changes by the mutator and without any addition of further objects. But reflection reveals that the general approach just described still applies when such mutations occur.

It is apparent from the foregoing description that using remembered sets to summarize information gleaned from the write-barrier output greatly expedites the process of identifying collection-set objects that are potentially reachable. But the use of remembered sets imposes costs, among which is the memory space required to store them.

SUMMARY OF THE INVENTION

I have developed a way of maintaining these remembered sets that tends to maximize their memory efficiency and affords particular advantages in multiprocessor systems.

In accordance with the invention, the entries in a car or other region's remembered are stored in a composite table. The composite table includes a locator array and plurality of constituent tables that contain the entries. Entries in the locator array identify the constituent tables' locations.

Thus implementing a remembered set's storage in a plurality of constituent tables yields a number of advantages. It tends to tailor storage area more closely to what is actually required and to use the memory space required more efficiently.

Suppose, for example, that the constituent table in which an entry is to be made is determined through a hash function: the result of the hash function identifies one of the slots in the locator array, and the entry in that slot identifies the constituent table into which the entry will be placed. Suppose further that the location within the constituent lower-level table is determined by a hash function, too. Since there are a plurality of constituent tables, the hash functions employed to determine locations within different constituent tables can be different, and, as will be shown below, this enables efficiency to be maximized.

Moreover, the granularities with which the different constituent tables' entries specify potentially reference-containing locations can be different. Also, the heap portions covered by different constituent tables may be of different sizes. As will be shown below, this enables the different tables to be optimized for the widely varying densities with which references to objects in a given car or other section occur in different portions of the heap. If the collector is implemented in multiple execution threads, moreover, the use of multiple constituent tables reduces contention for access to the remembered set.

BRIEF DESCRIPTION OF THE DRAWINGS

The invention description below refers to the accompanying drawings, of which.

DETAILED DESCRIPTION OF AN ILLUSTRATIVE EMBODIMENT

Although the present invention's applicability is not limited to collectors that employ the train algorithm, it will be described below by reference to an embodiment that does. A collector that uses the train algorithm need restrict collection activity to intervals dedicated only to collection. Nor, if it does so, need a full collection increment be performed entirely within a single such interval. For the sake of concreteness, though, such an embodiment will be assumed in the description below.

Figure 1:
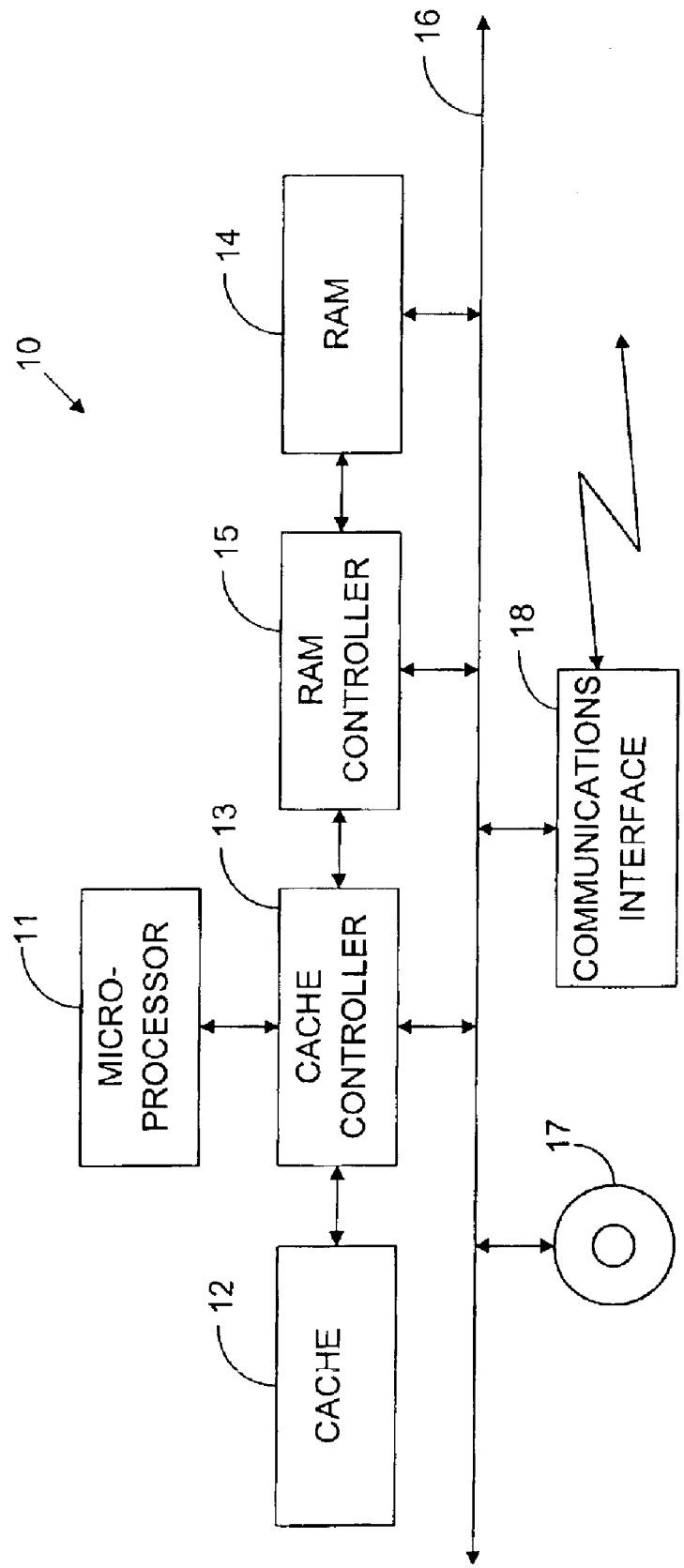
FIG. 1, discussed above, is a block diagram of a computer system in which the present invention's teachings can be practiced.
Figure 2:
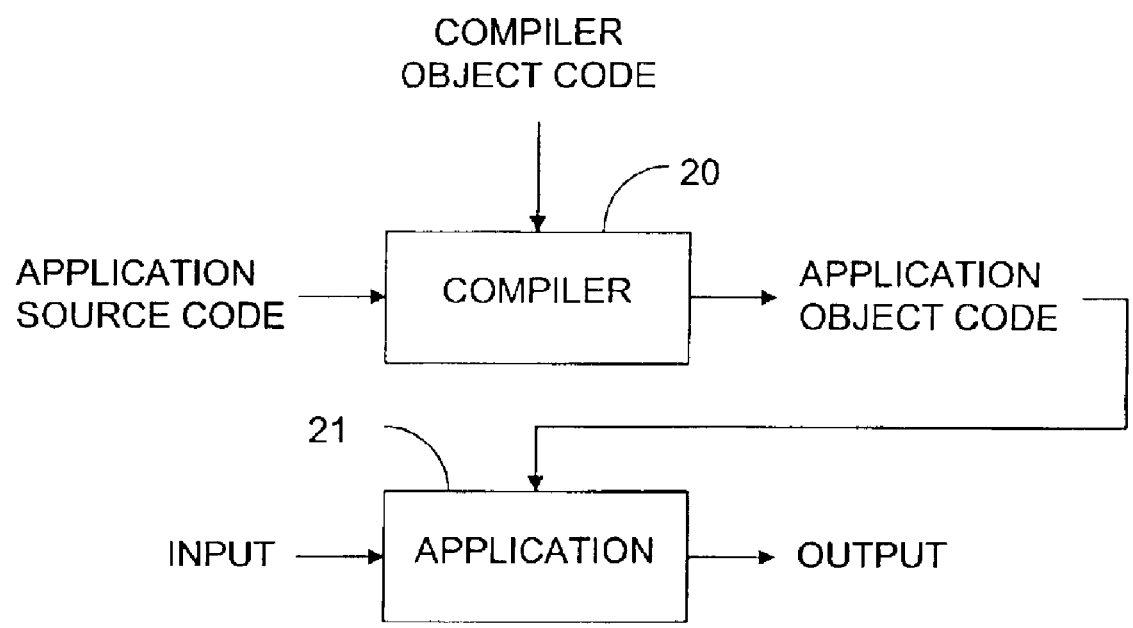
FIG. 2 is, discussed above, is a block diagram that illustrates a compiler's basic functions.
Figure 3:
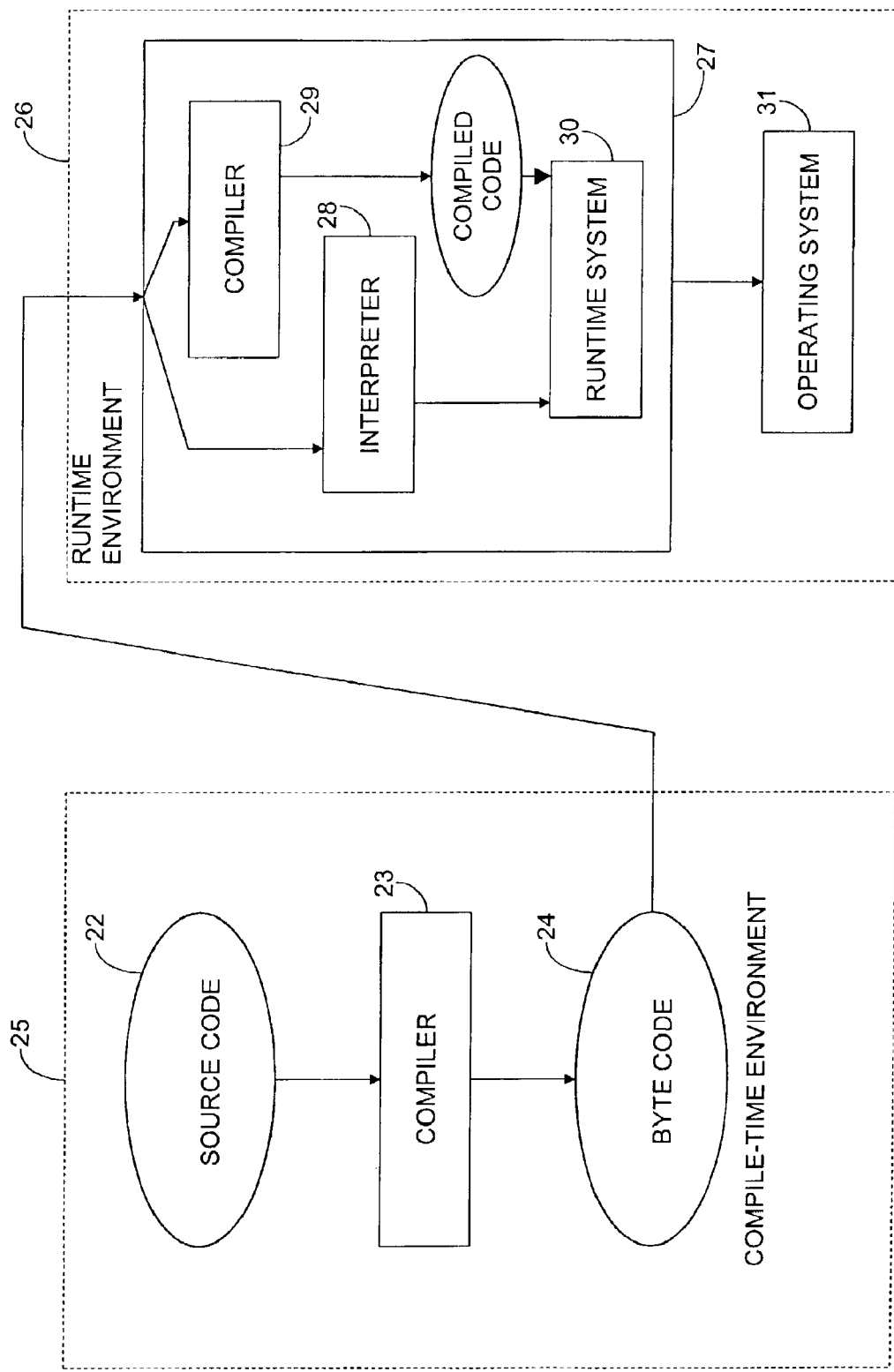
FIG. 3, discussed above, is a block diagram that illustrates a more-complicated compiler/interpreter organization.
Figure 4:
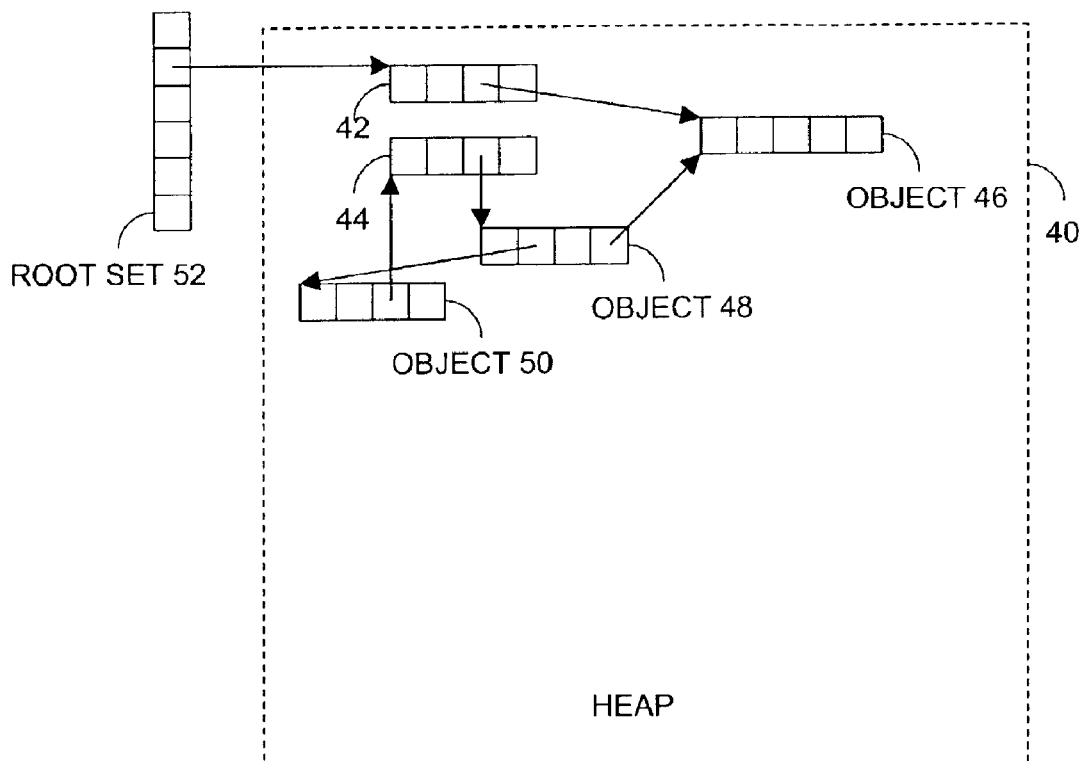
FIG. 4, discussed above, is a diagram that illustrates a basic garbage-collection mechanism.
Figure 5:
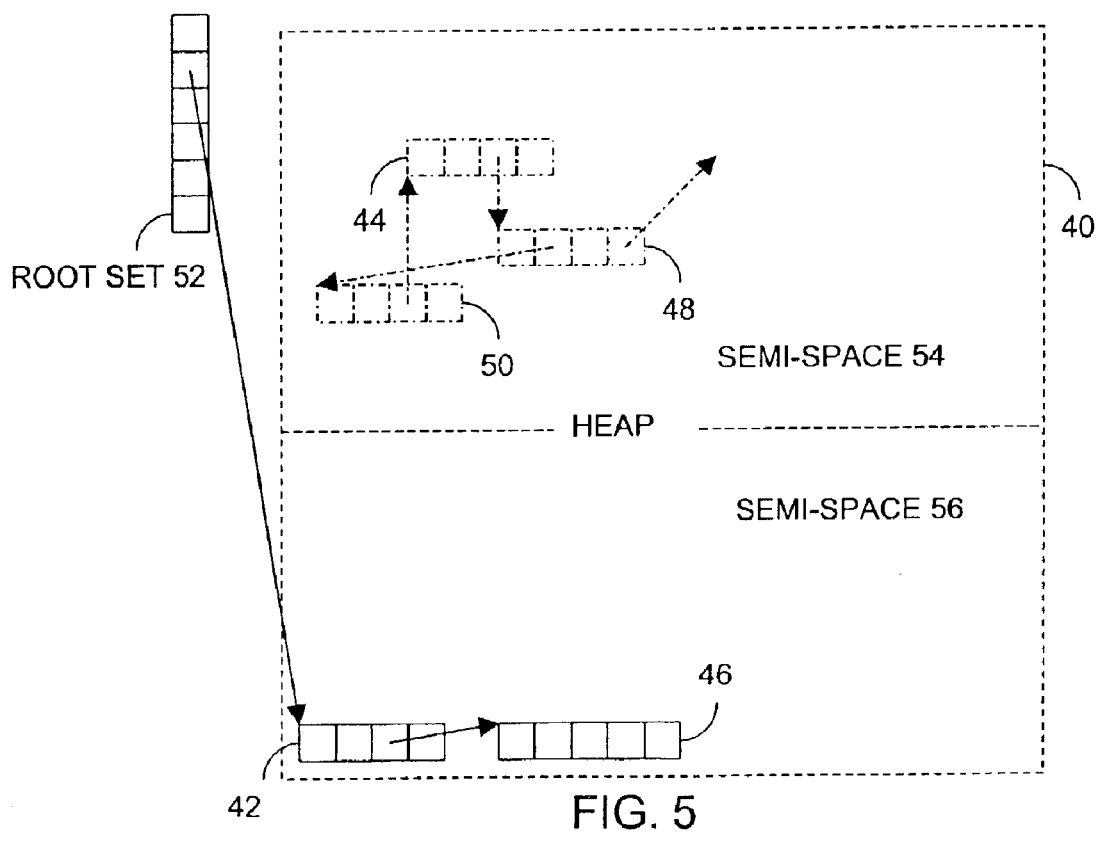
FIG. 5, discussed above, is a similar diagram illustrating that garbage-collection approach's relocation operation.
Figure 6:
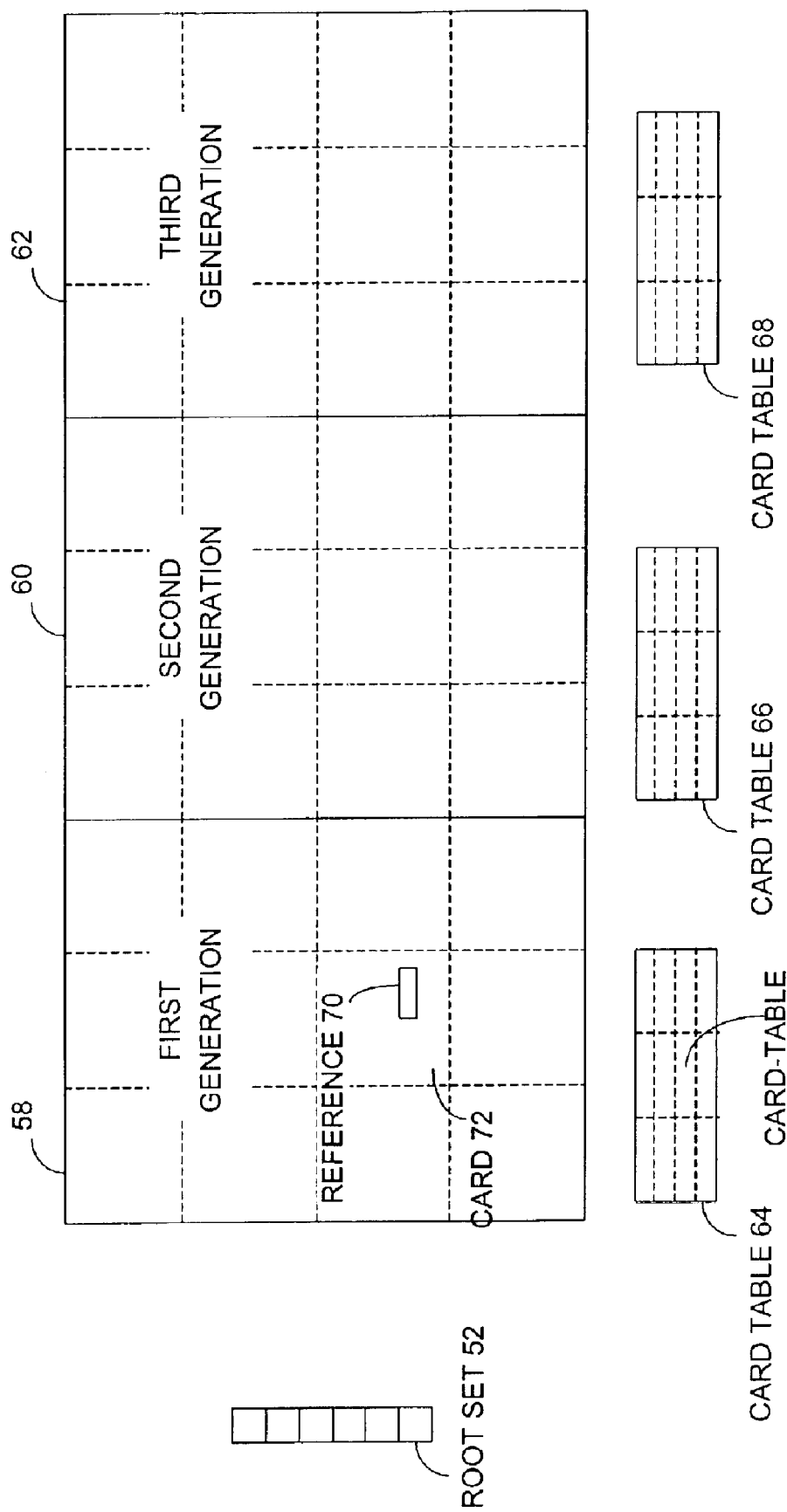
FIG. 6, discussed above, is a diagram that illustrates a garbage-collected heap's organization into generations.
Figure 7:
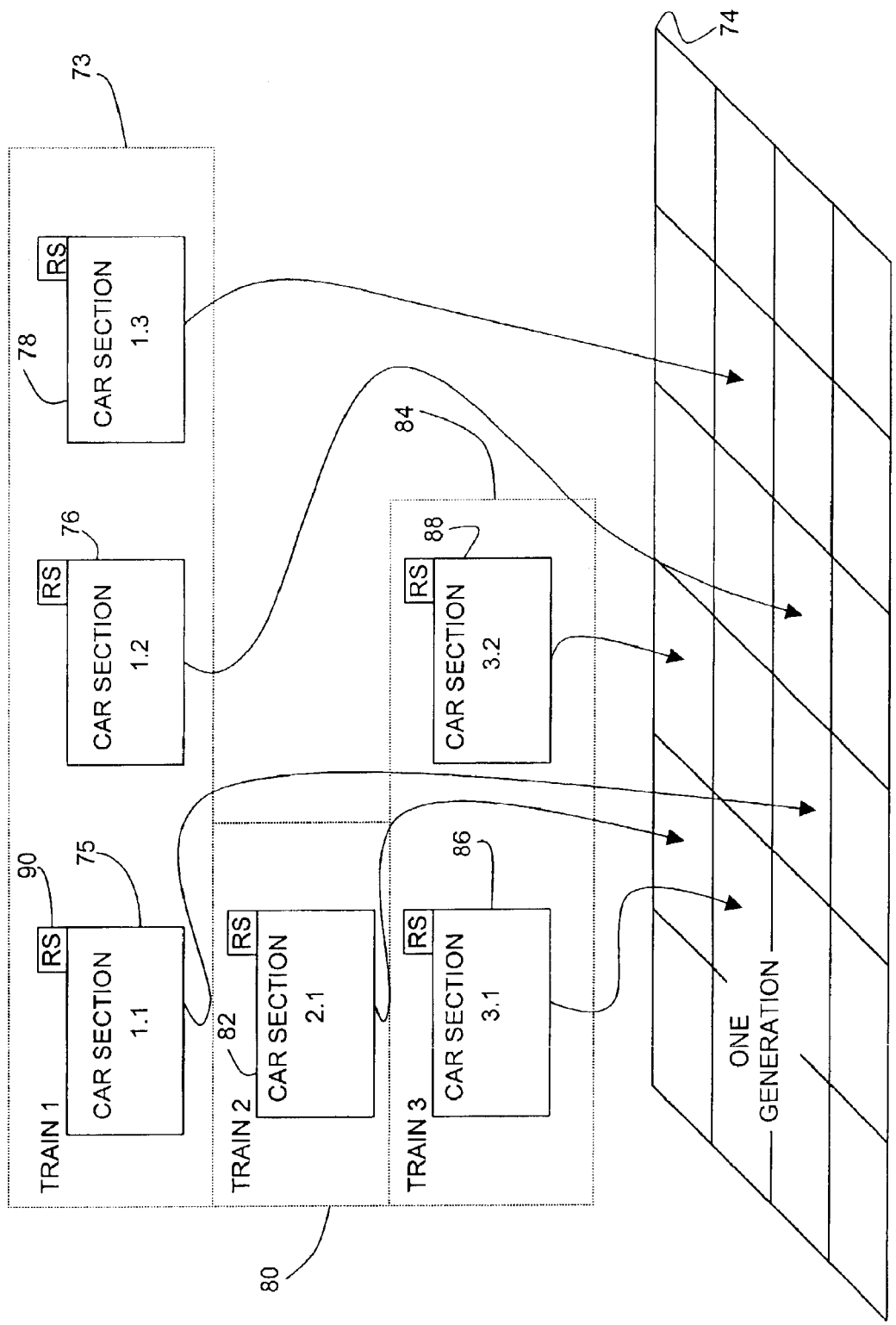
FIG. 7, discussed above, is a diagram that illustrates a generation organization employed for the train algorithm.
Figure 8A:
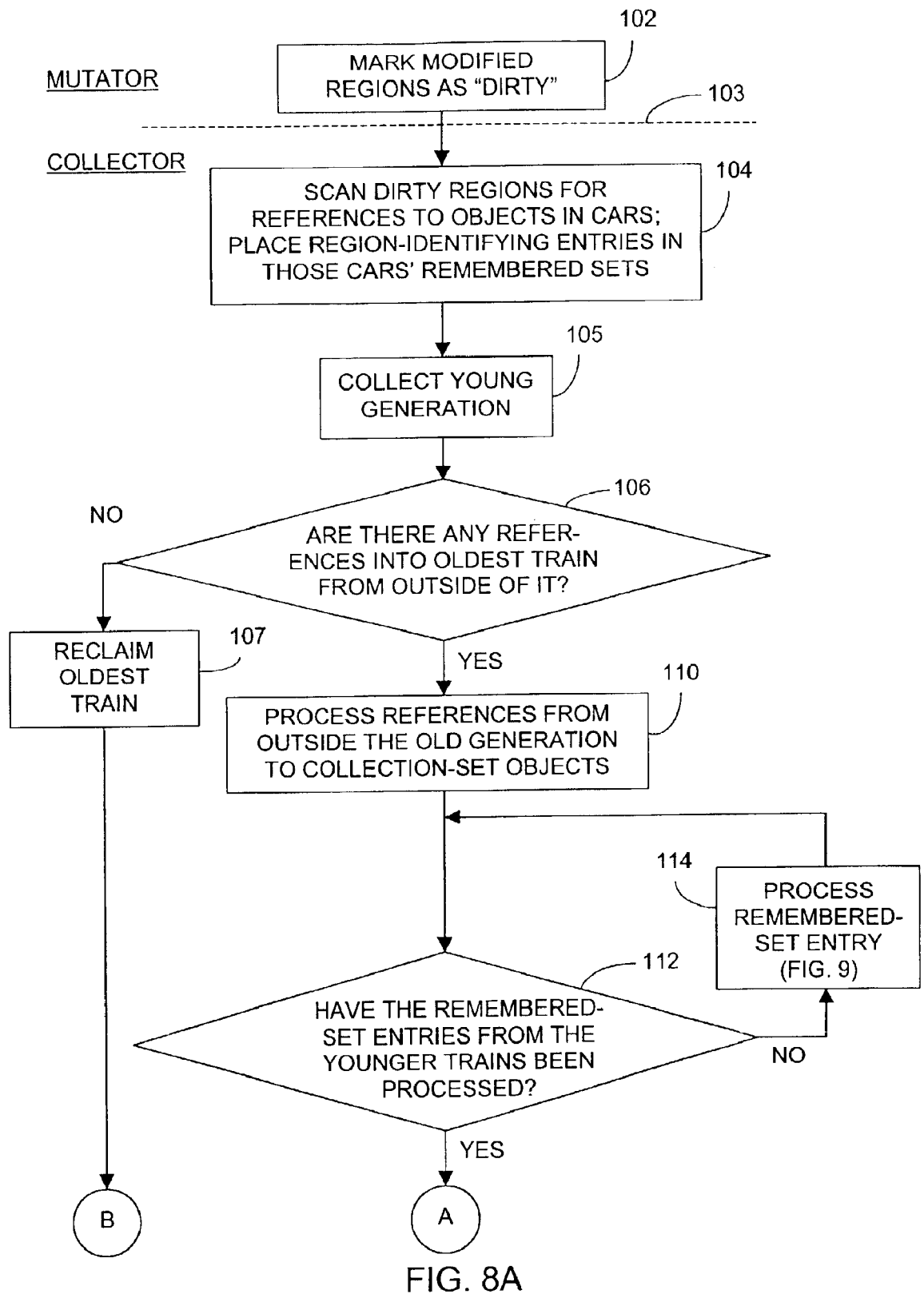
FIGS. 8A and 8B, discussed above, together constitute a flow chart that illustrates a garbage-collection interval that includes old-generation collection.
Figure 8B:
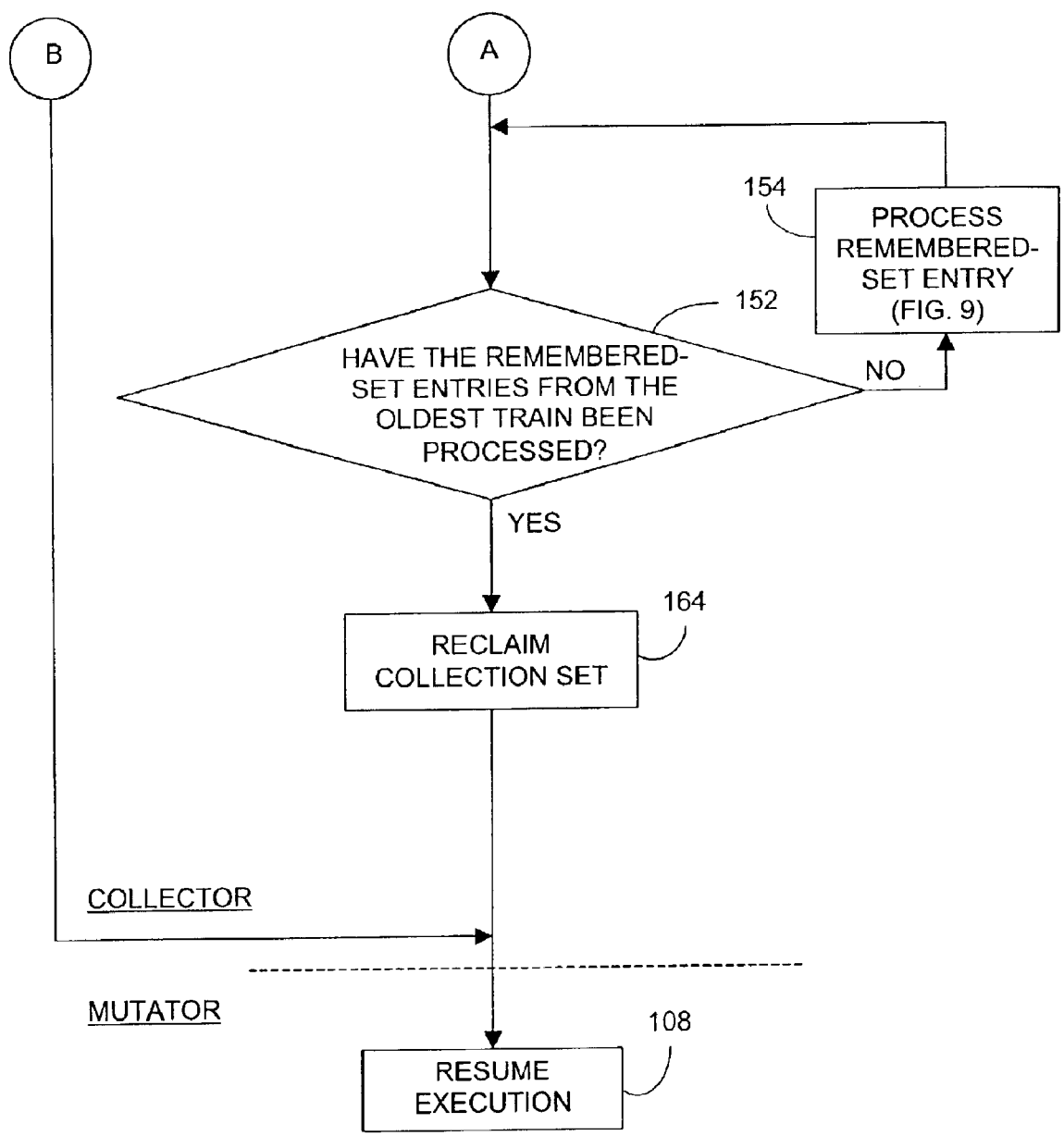
Figure 9:
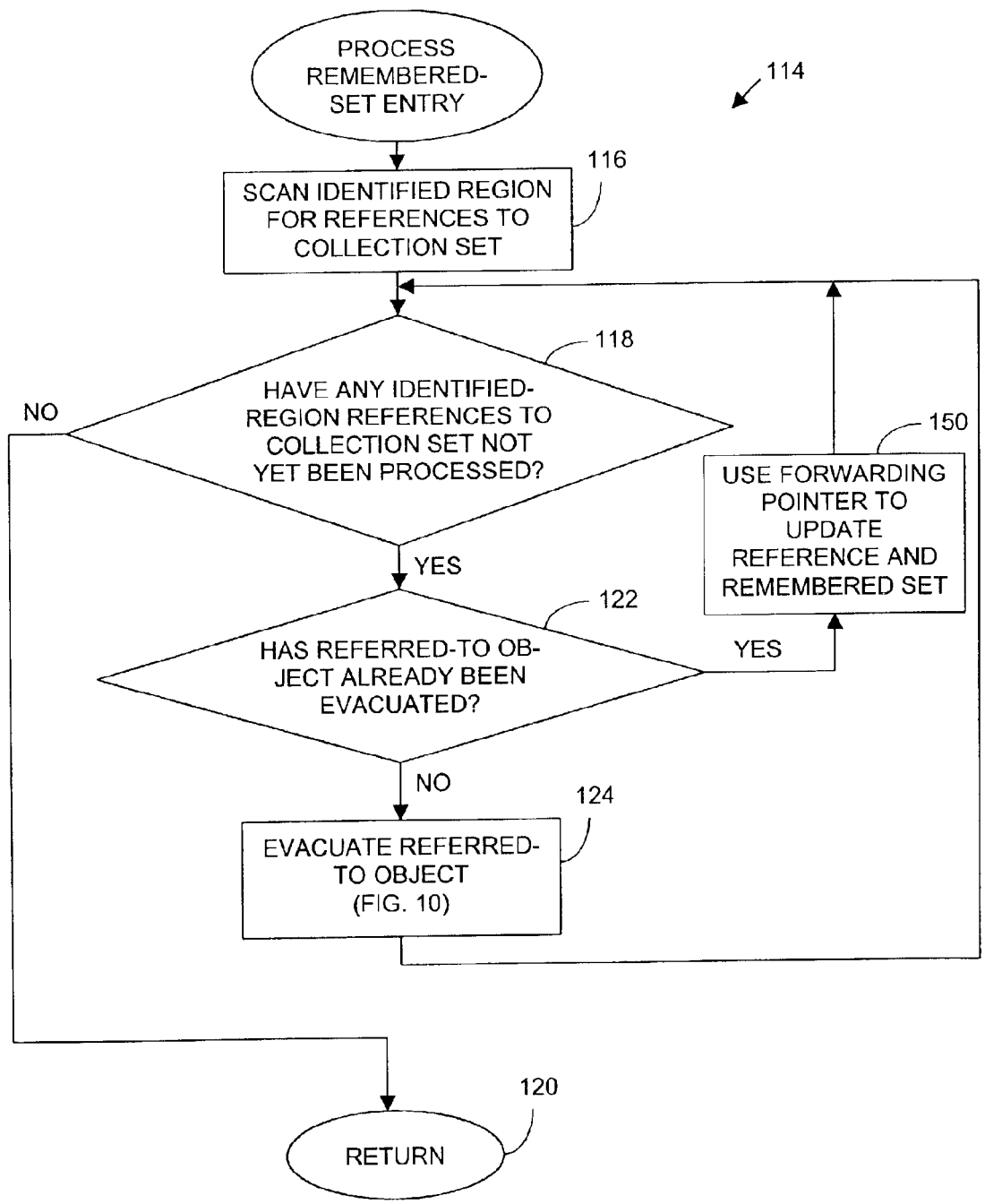
FIG. 9, discussed above, is a flow chart that illustrates in more detail the remembered-set processing included in FIG. 8A.
Figure 10:
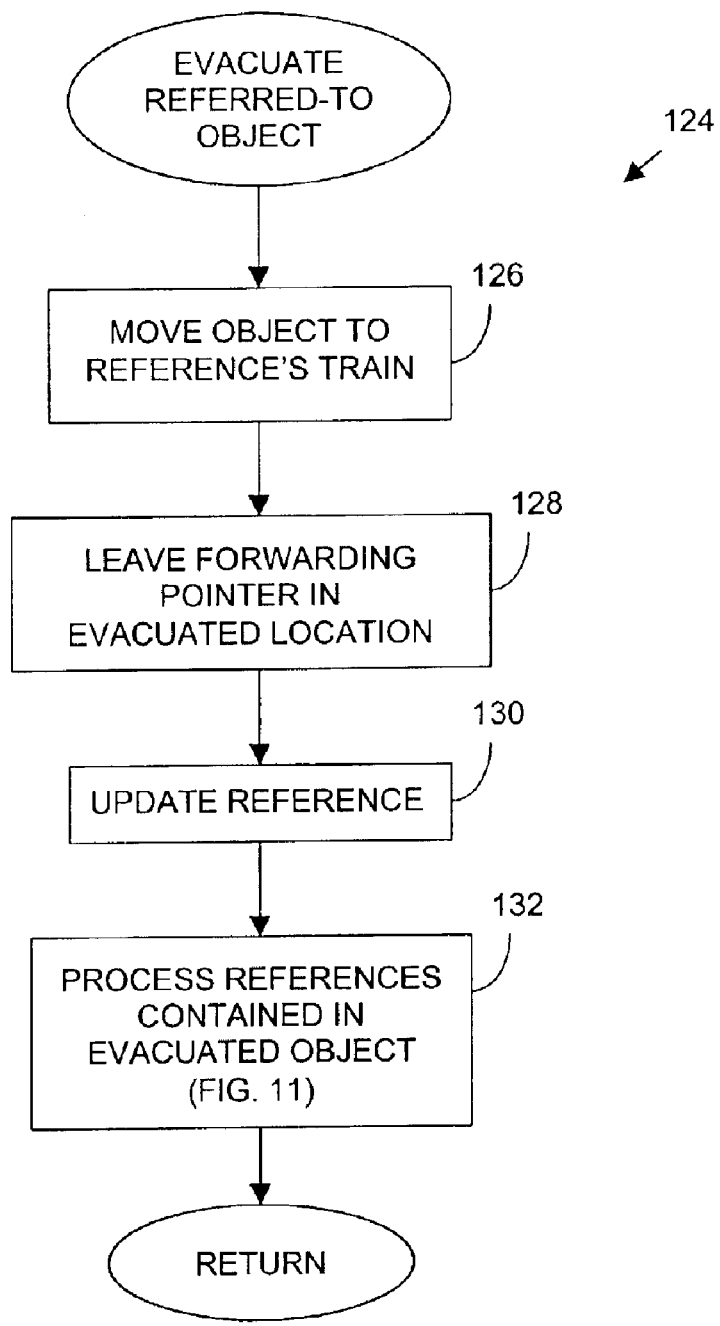
FIG. 10, discussed above, is a block diagram that illustrates in more detail the referred-to-object evacuation that FIG. 9 includes.
Figure 11A:
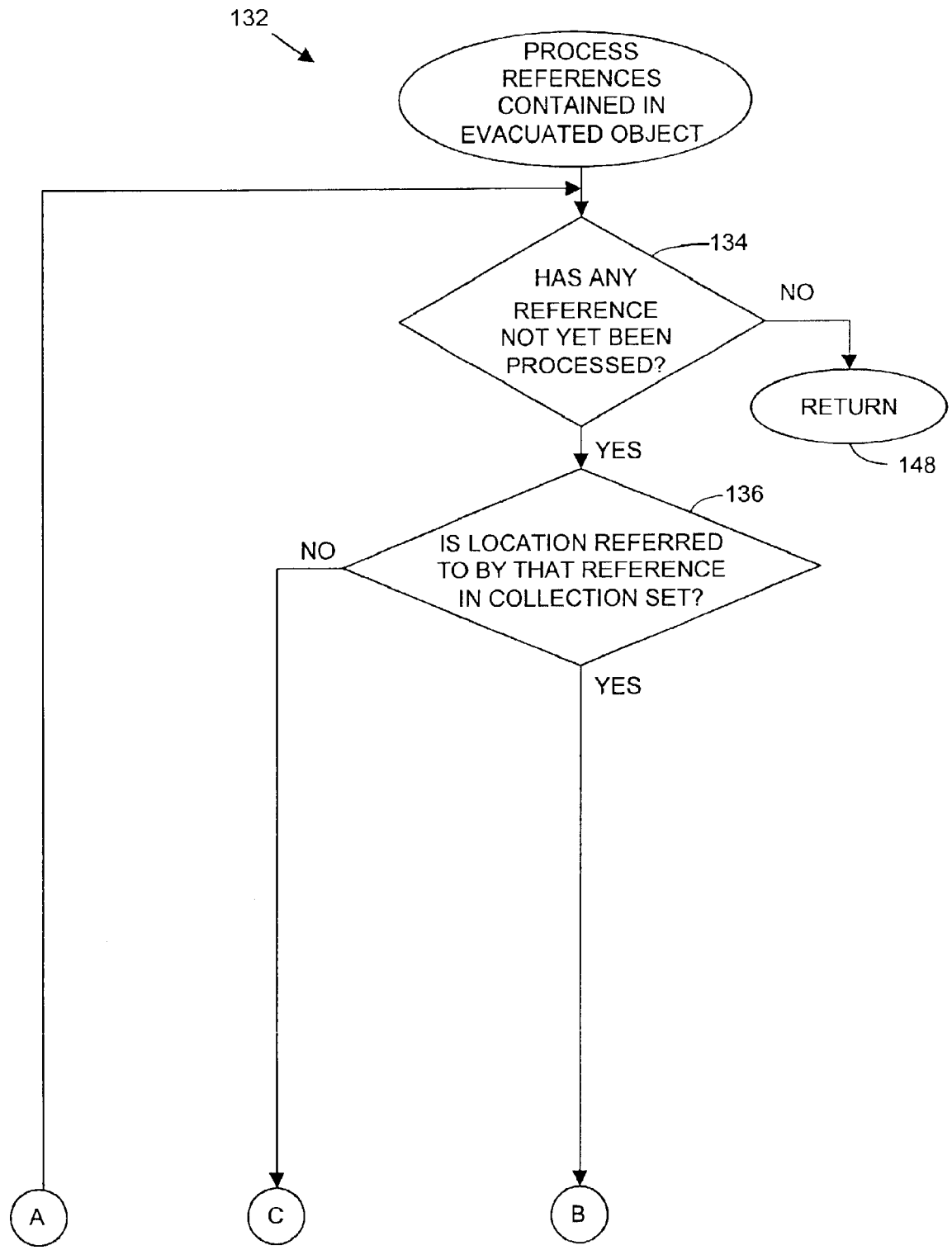
FIGS. 11A and 11B, discussed above, together form a flow chart that illustrates in more detail the FIG. 10 flow chart's step of processing evacuated objects' references.
Figure 11B:
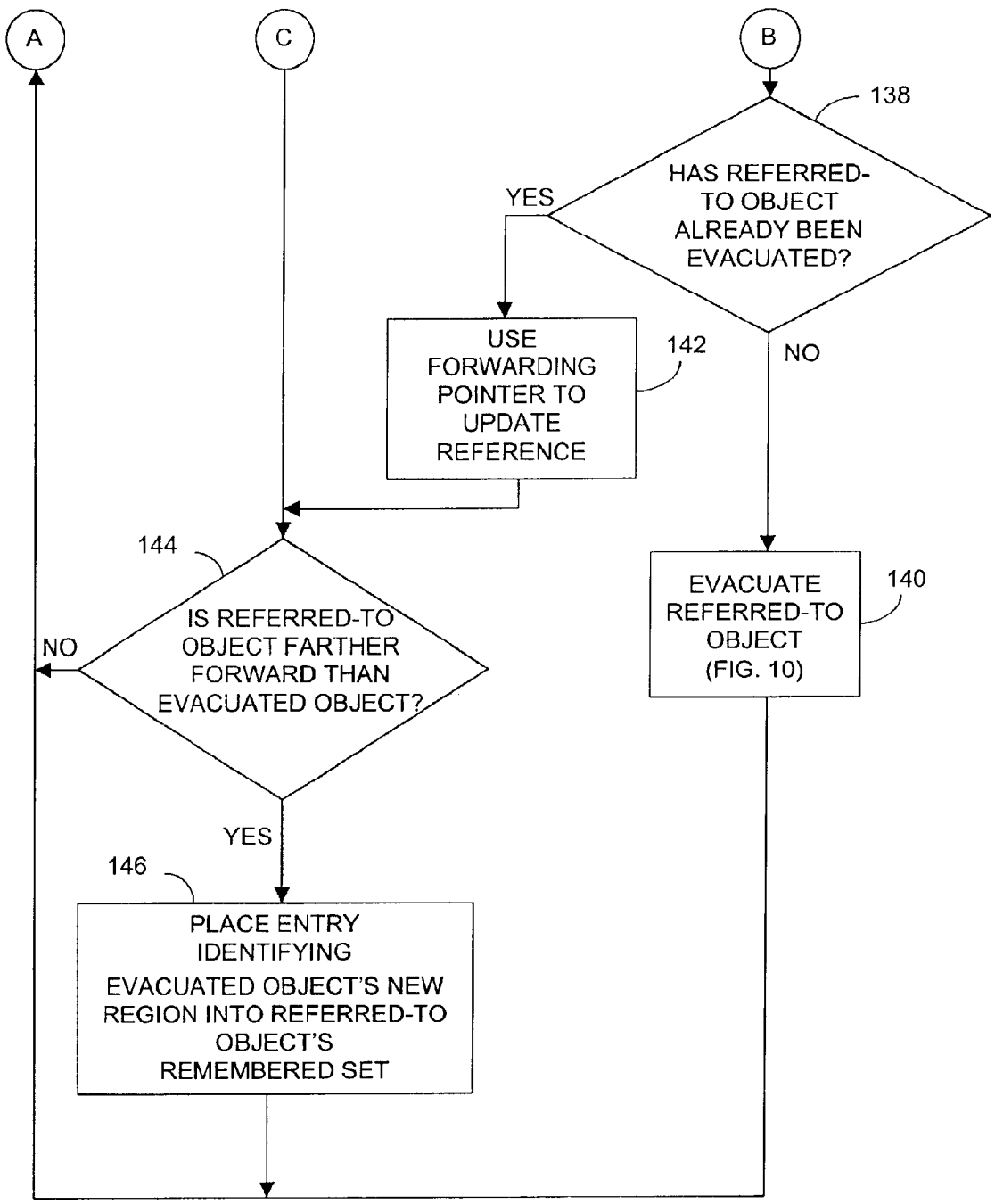
Figure 12A:
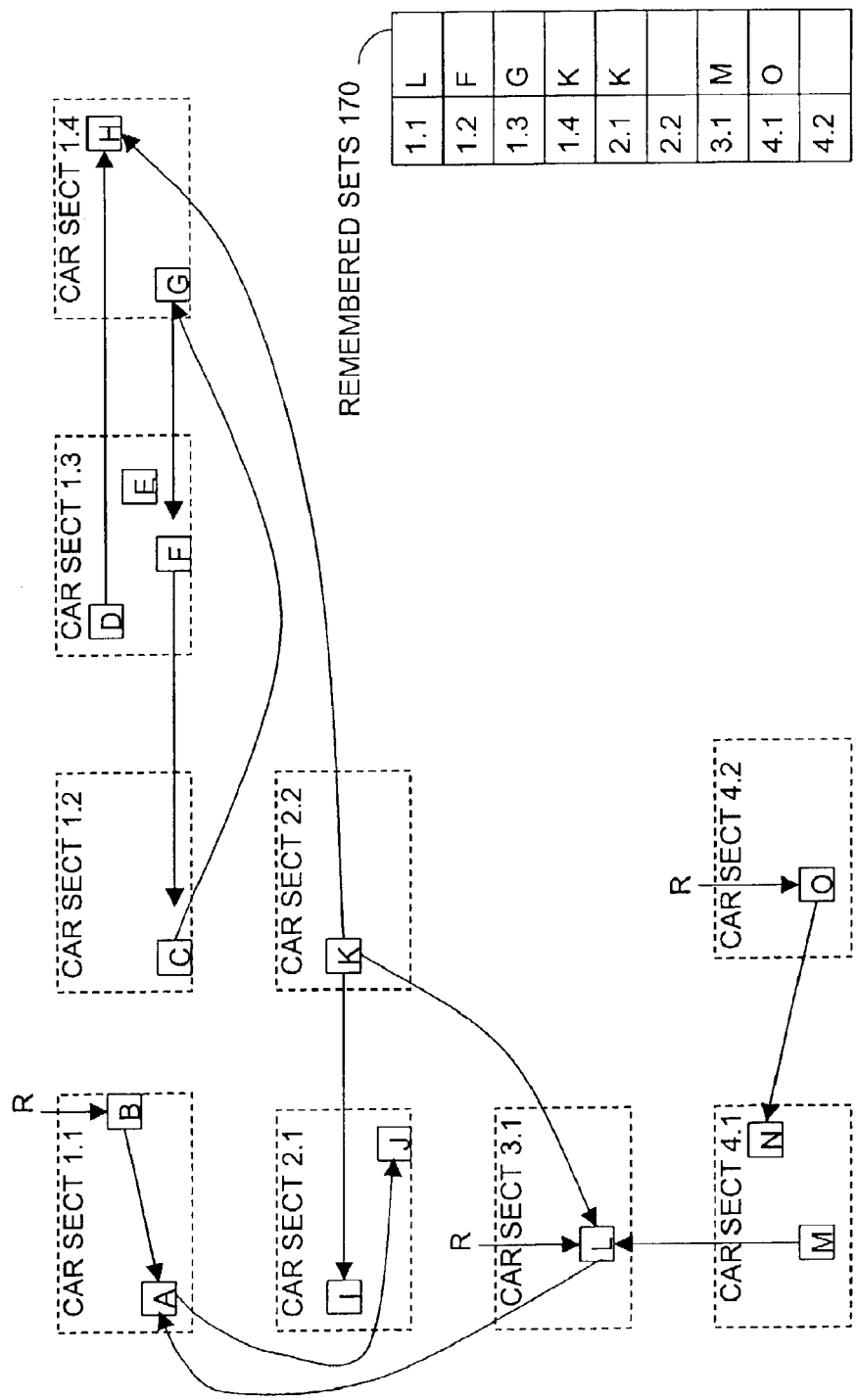
FIGS. 12A–12J, discussed above, are diagrams that illustrate a collection scenario that can result from using the train algorithm.
Figure 12B:
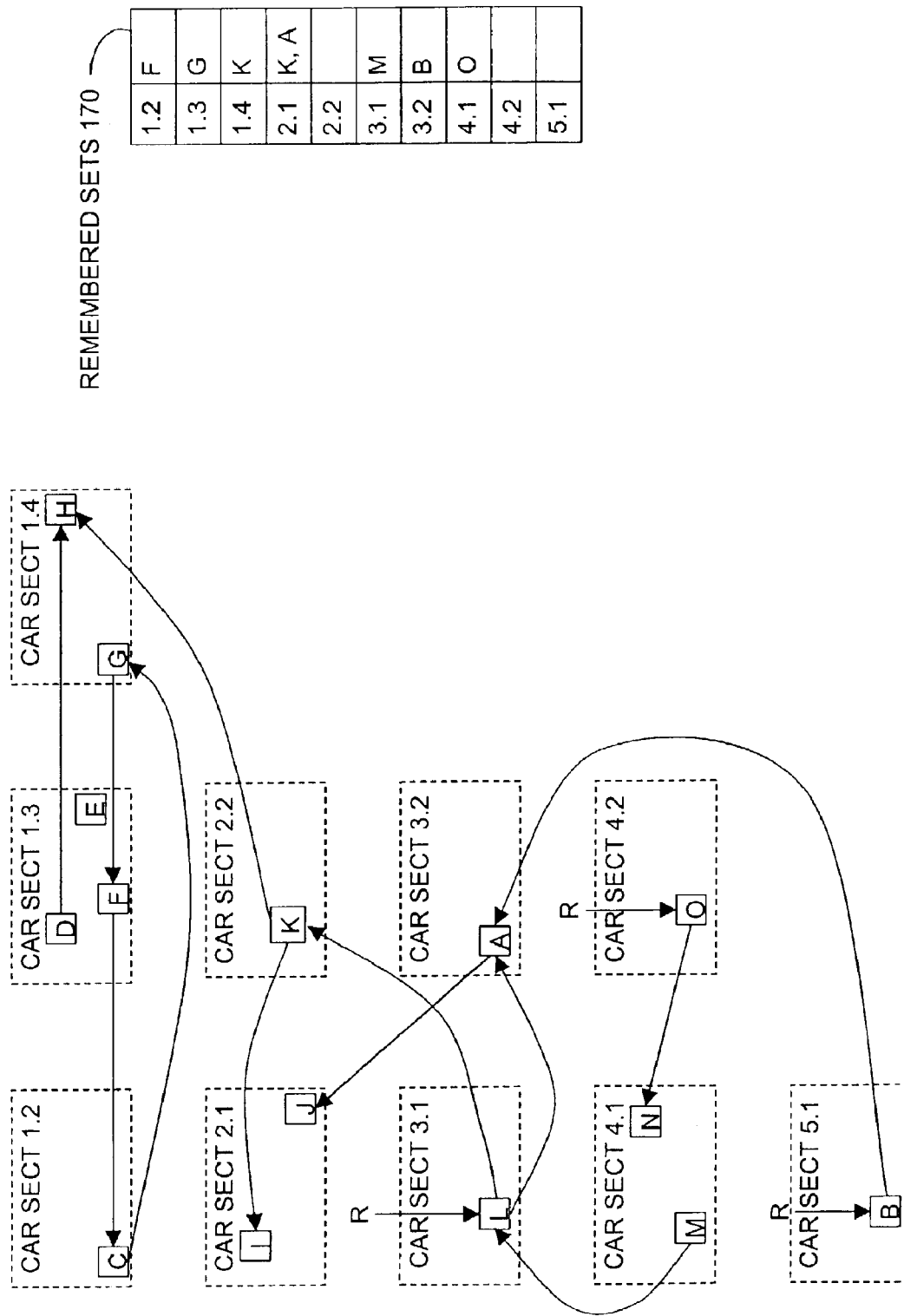
Figure 12C:
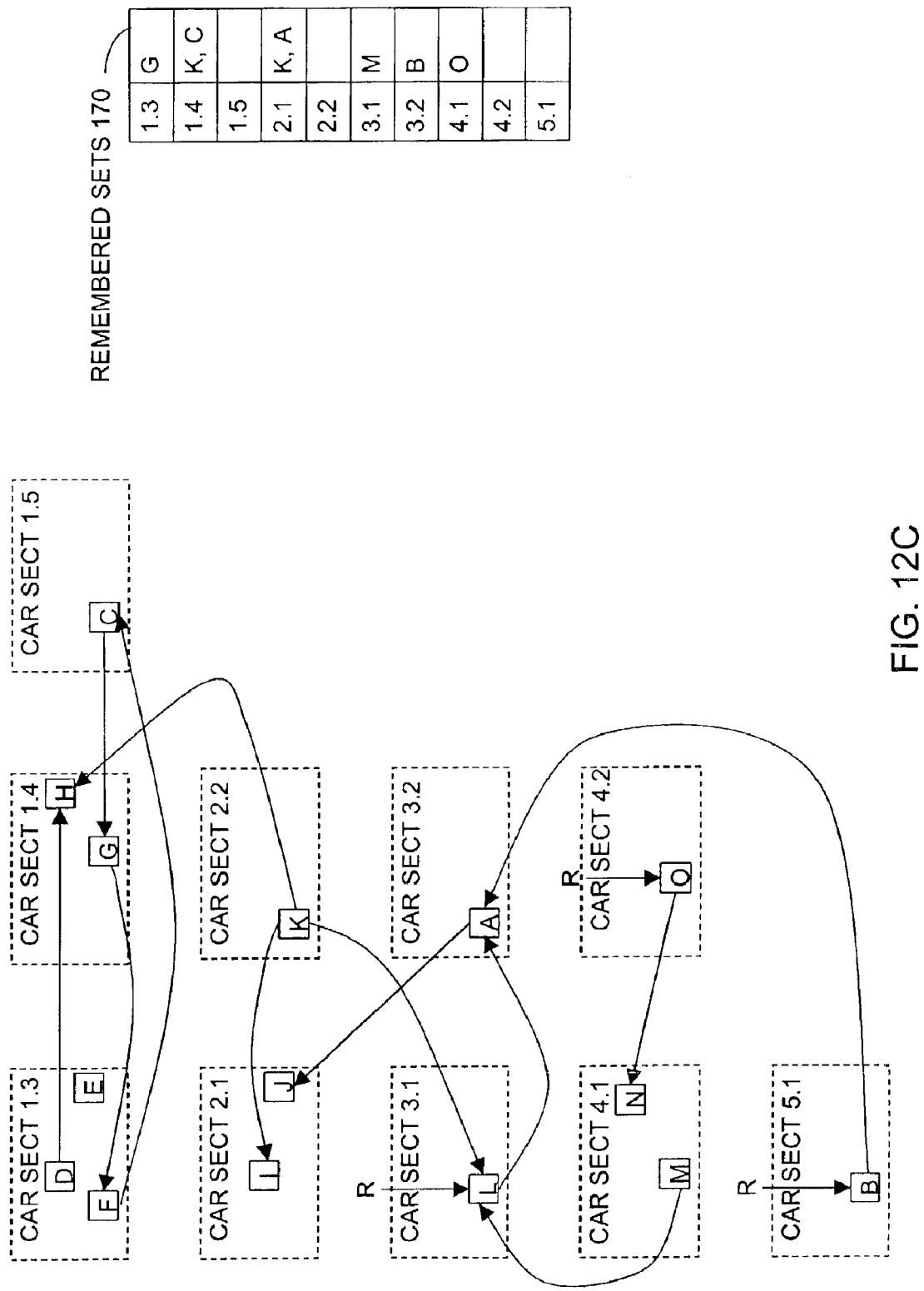
Figure 12D:
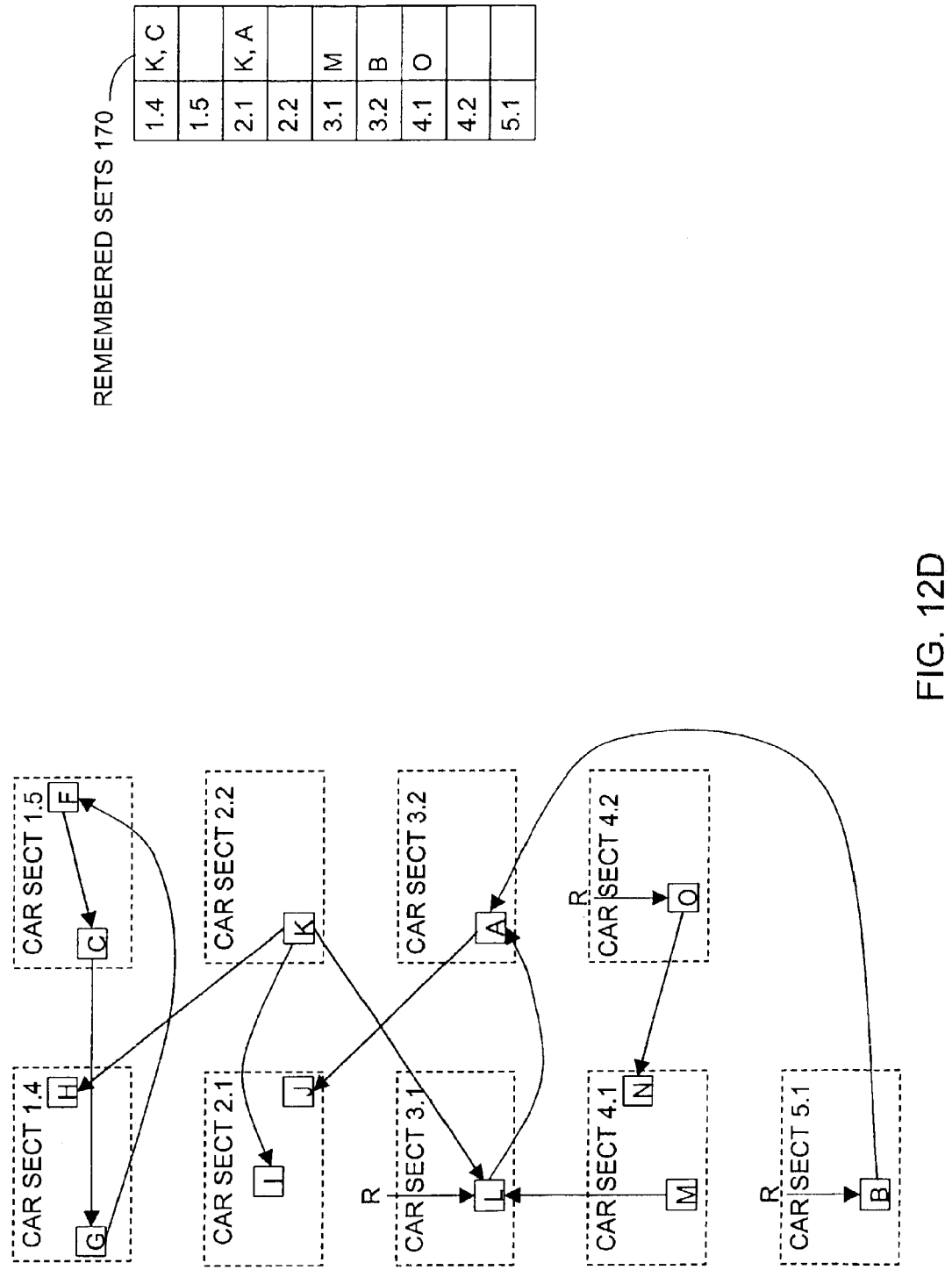
Figure 12E:
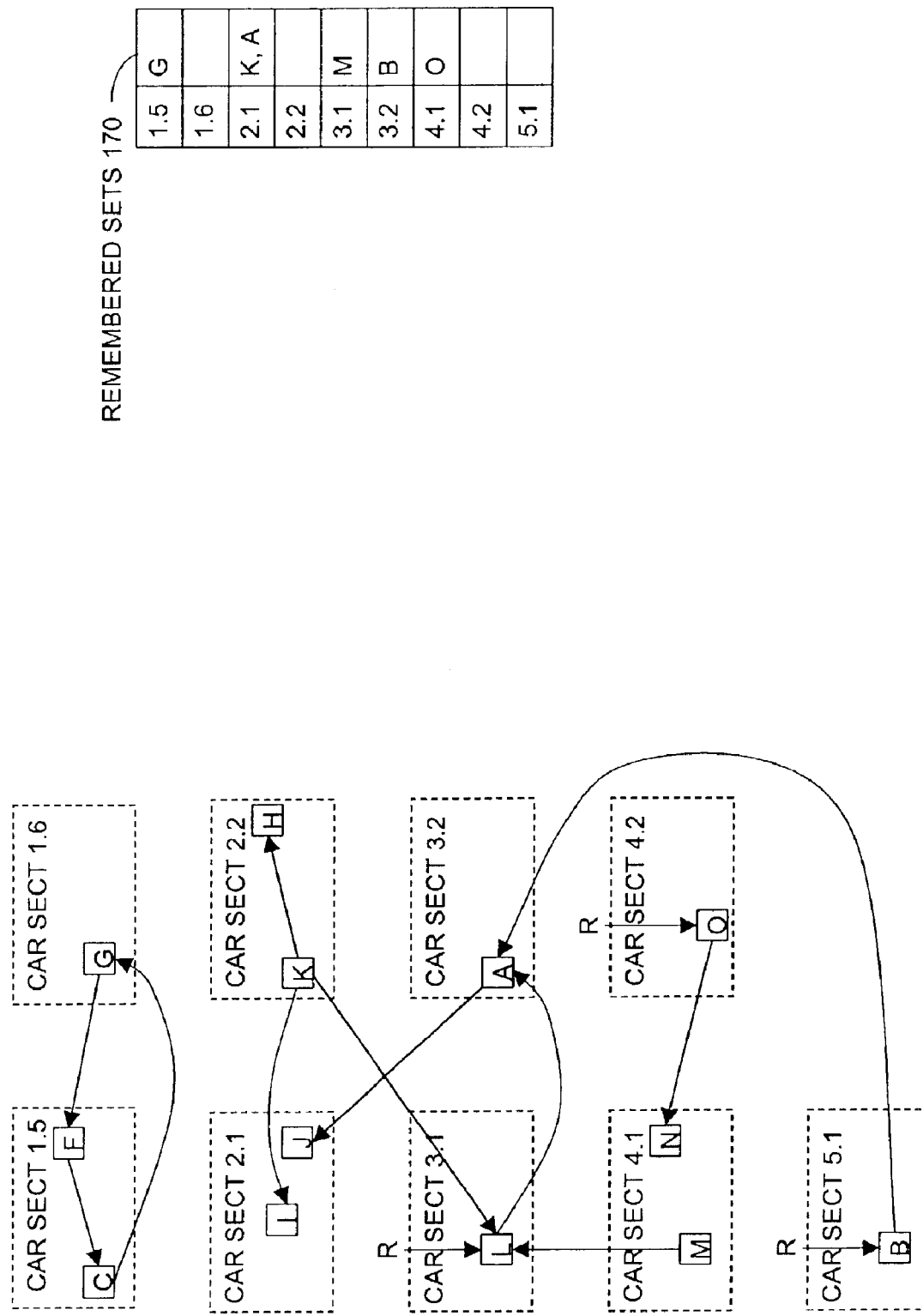
Figure 12F:
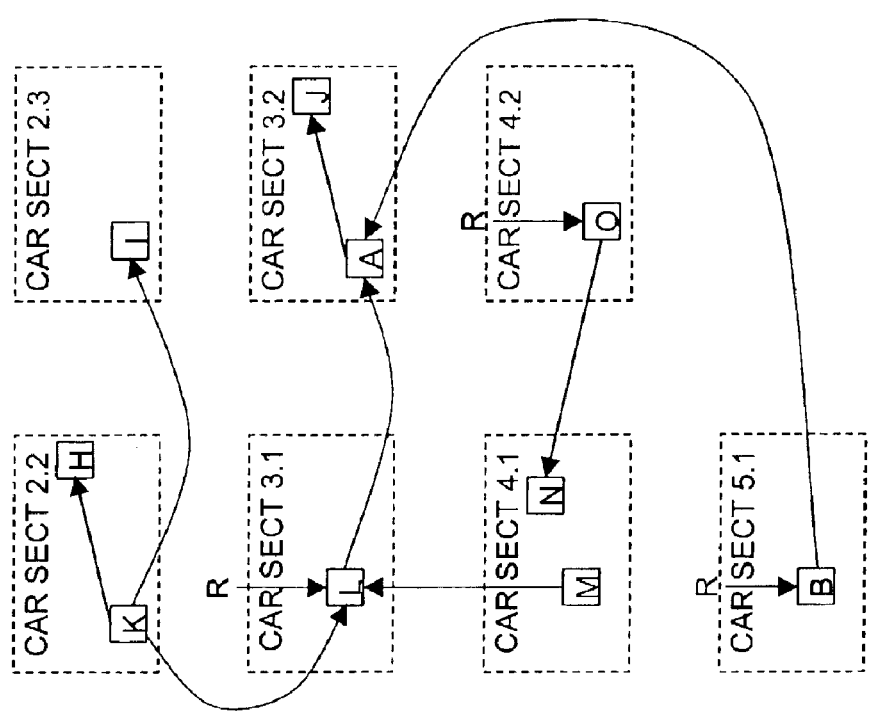
Figure 12G:
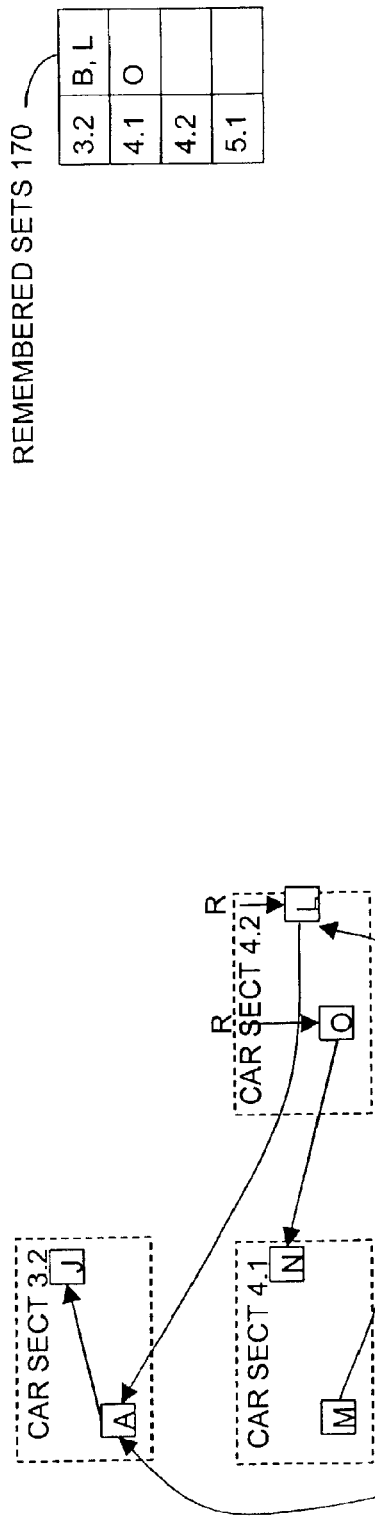
Figure 12H:
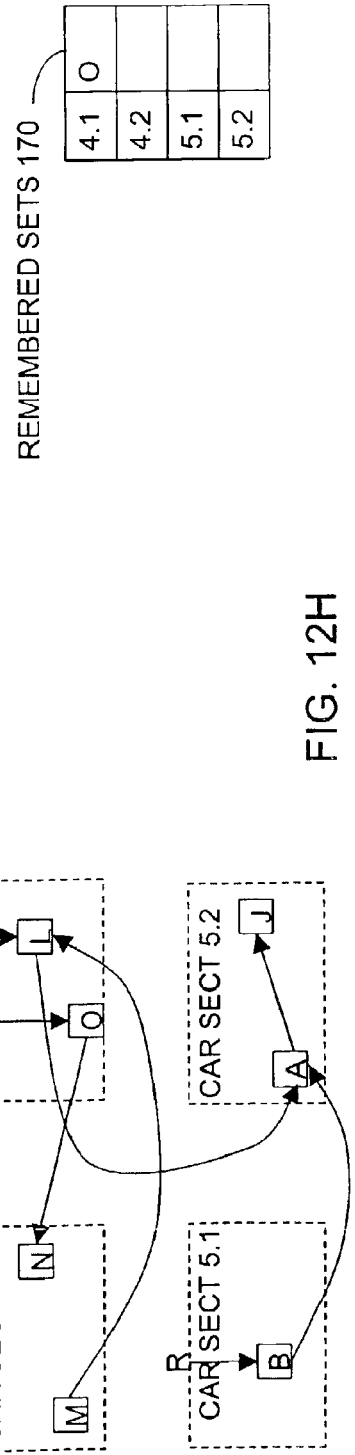
Figure 12I:
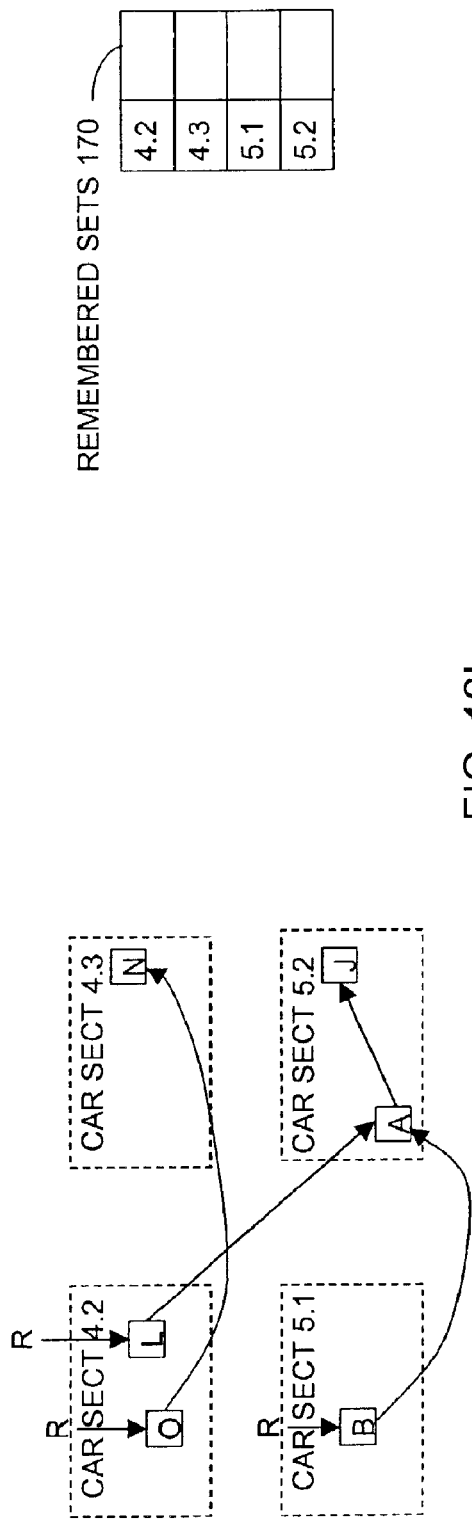
Figure 12J:
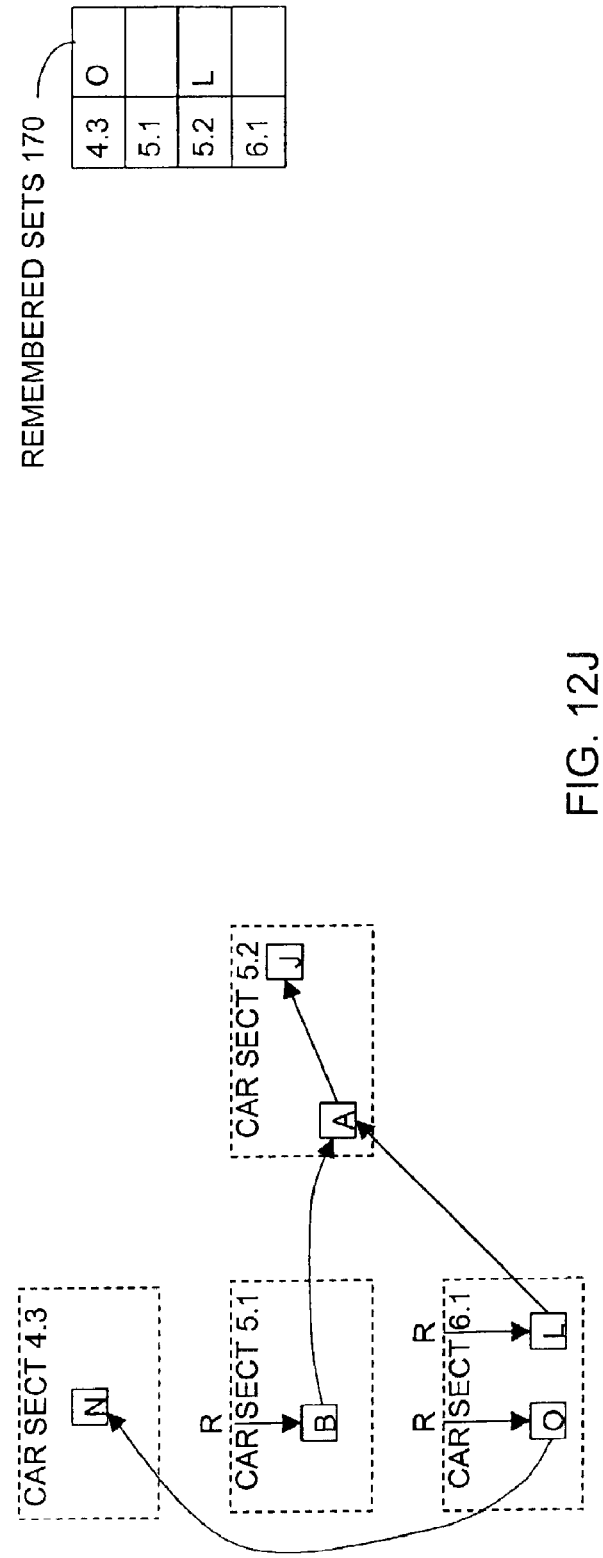
Figure 13A:
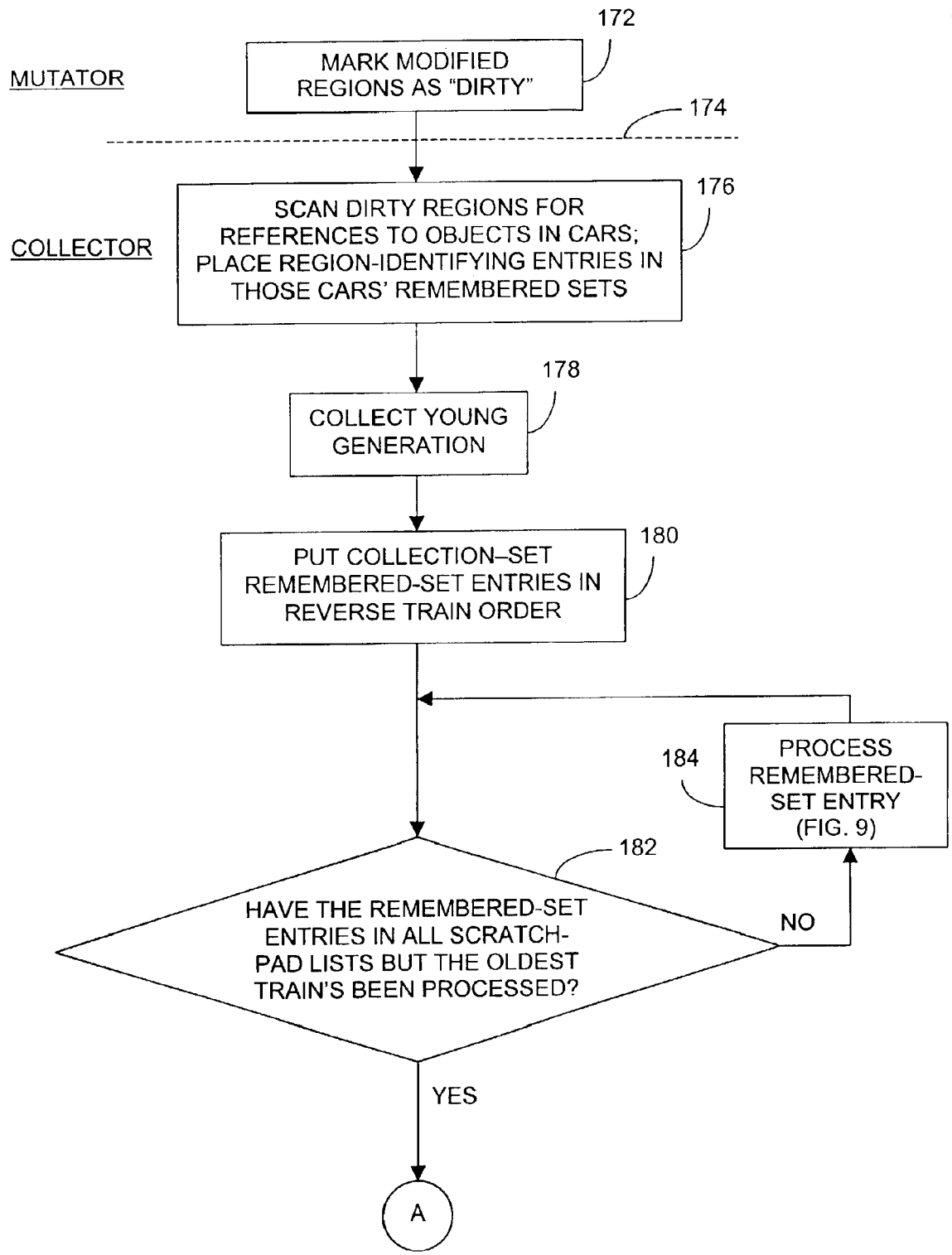
FIGS. 13A and 13B together constitute a flow chart that illustrates a collection interval, as FIGS. 8A and 8B do, but illustrates optimizations that FIGS. 8A and 8B do not include.
Figure 13B:
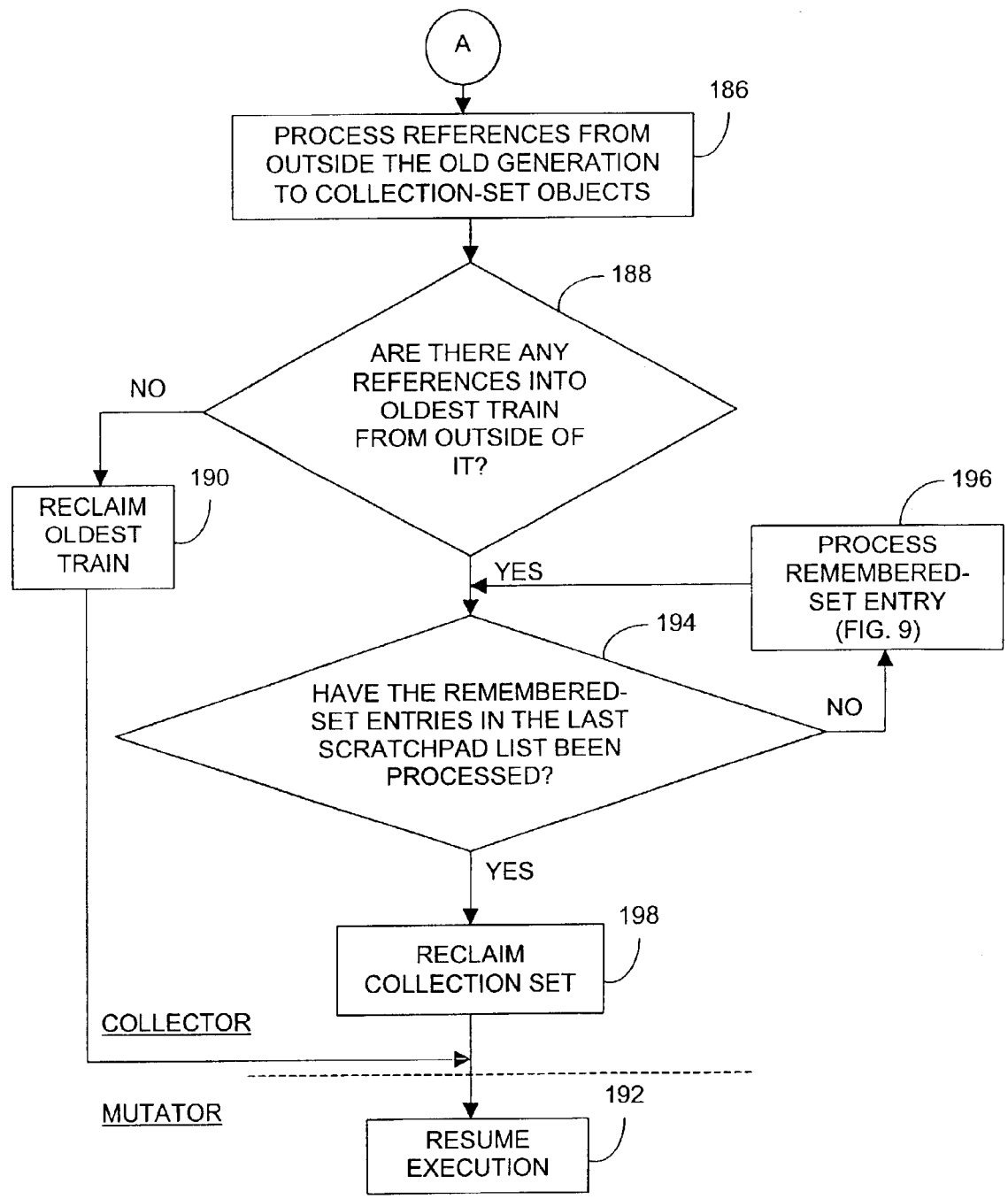

Still, even if a full collection increment is performed within a single interval, the implementation of the algorithm need not be the same as the one described above in connection with FIGS. 8A, 8B, and 9–11, and I prefer to employ the present invention's teachings in a collector whose processing sequence is more like what FIGS. 13A and 13B (together, "FIG. 13") depict. Those drawings depict a collection operation that is similar to the one of FIG. 8, but FIG. 13 reflects the possibility of multiple-car collection sets and depicts certain optimizations that some of the invention's embodiments may employ.

Blocks 172, 176, and 178 represent operations that correspond to those that FIG. 8's blocks 102, 106, and 108 do, and dashed line 174 represents the passage of control from the mutator to the collector, as FIG. 8's dashed line 104 does. For the sake of efficiency, though, the collection operation of FIG. 13 includes a step represented by block 180. In this step, the collector reads the remembered set of each car in the collection set to determine the location of each reference into the collection set from a car outside of it, it places the address of each reference thereby found into a scratch-pad list associated with the train that contains that reference, and it places the scratch-pad lists in reverse-train order. As blocks 182 and 184 indicate, it then processes the entries in all scratch-pad lists but the one associated with the oldest train.

Before the collector processes references in that train's scratch-pad list, the collector evacuates any objects referred to from outside the old generation, as block 186 indicates. To identify such objects, the collector scans the root set. In some generational collectors, it may also have to scan other generations for references into the collection set. For the sake of example, though, we have assumed the particularly common scheme in which a generation's collection in a given interval is always preceded by complete collection of every (in this case, only one) younger generation in the same interval. If, in addition, the collector's promotion policy is to promote all surviving younger-generation objects into older generations, it is necessary only to scan older generations, of which there are none in the example; i.e., some embodiments may not require that the young generation be scanned in the block-186 operation.

For those that do, though, the scanning may actually involve inspecting each surviving object in the young generation, or the collector may expedite the process by using card-table entries. Regardless of which approach it uses, the collector immediately evacuates into another train any collection-set object to which it thereby finds an external reference. The typical policy is to place the evacuated object into the youngest such train. As before, the collector does not attempt to evacuate an object that has already been evacuated, and, when it does evacuate an object to a train, it evacuates to the same train each collection-set object to which a reference in the thus-evacuated object refers. In any case, the collector updates the reference to the evacuated object.

When the inter-generational references into the generation have thus been processed, the garbage collector determines whether there are any references into the oldest train from outside that train. If not, the entire train can be reclaimed, as blocks 188 and 190 indicate.

As block 192 indicates, the collector interval typically ends when a train has thus been collected. If the oldest train cannot be collected in this manner, though, the collector proceeds to evacuate any collection-set objects referred to by references whose locations the oldest train's scratch-pad list includes, as blocks 194 and 196 indicate. It removes them to younger cars in the oldest train, again updating references, avoiding duplicate evacuations, and evacuating any collection-set objects to which the evacuated objects refer. When this process has been completed, the collection set can be reclaimed, as block 198 indicates, since no remaining object is referred to from outside the collection set: any remaining collection-set object is unreachable. The collector then relinquishes control to the mutator.

Figure 14:
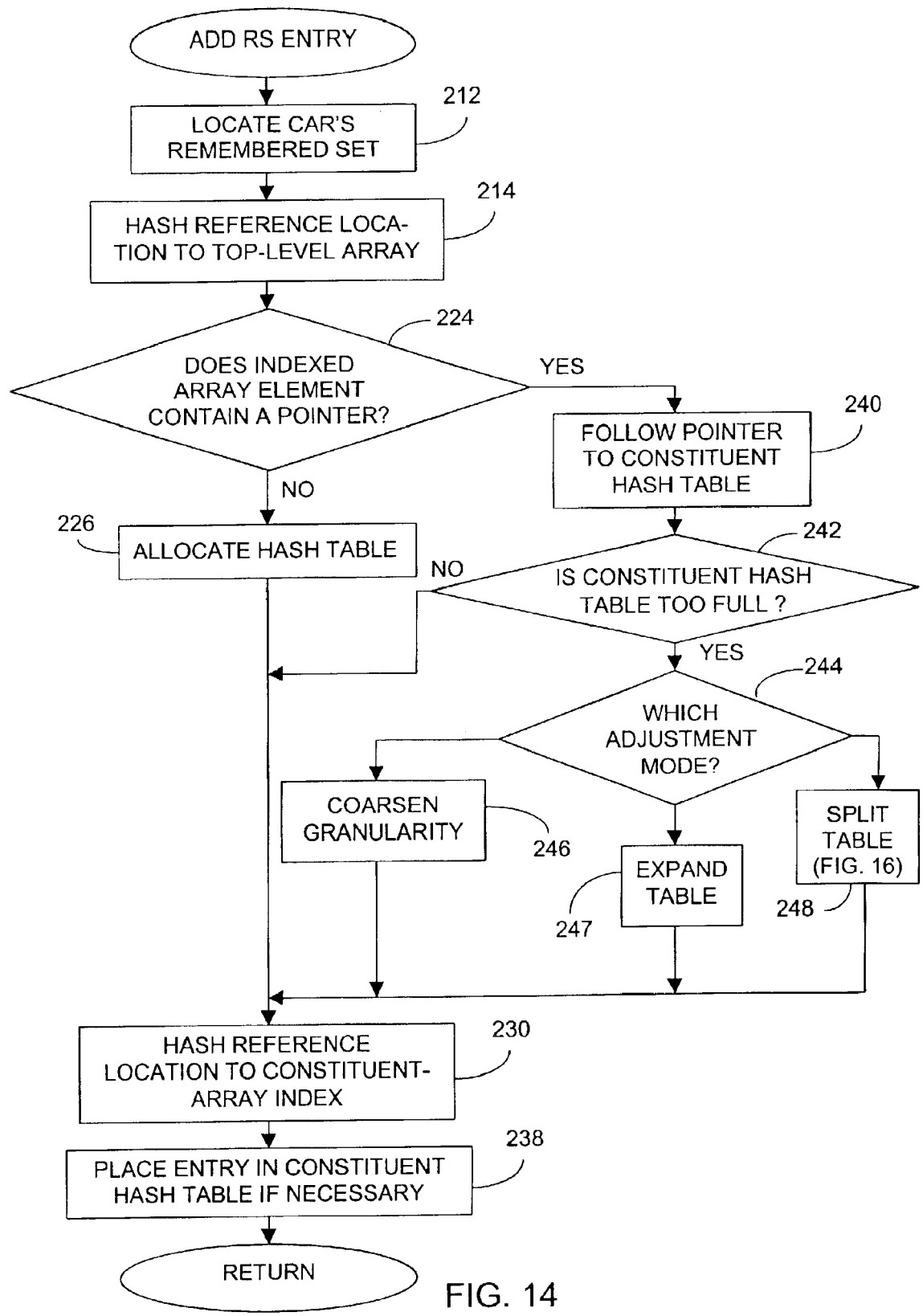
FIG. 14 is a flow chart of a routine that the illustrated embodiment uses to add a remembered-set entry.

Having now considered the collector's overall operational sequence, we now turn to a way in which the present invention's teachings may be implemented to maintain remembered sets. FIG. 14 is a flow chart that illustrates the operation for adding a remembered-set entry to a remembered set. Block 212 represents locating the appropriate remembered set. The collector will have established a relationship between reference addresses and the locations of the metadata structures associated with the car section that contains the reference. Typically, that metadata structure will include a pointer to the one of the data structures used to store the remembered set.

According to the present invention, the remembered set is stored in a plurality of component tables included in a composite table associated with the car section. In the illustrated embodiment, the composite table organized as a hash table, and the collector computes an index into that table by performing a hash on the reference address. For the sake of simplicity, we will take an example in which the address consists only of 16 bits, although it will more typically consist of 32 or 64 bits. As an example, let us assume that the address is (in hexadecimal notation) 929E. If we number the address bits from fifteen for the most-significant bit to zero for the least-significant bit, we can specify a hash function for a given address as simply a selection among those bits. If the hash function is the address bits numbered fifteen and fourteen, for instance, the hash function yields $10_2$. The result is an index into the hash table.

Figure 15:
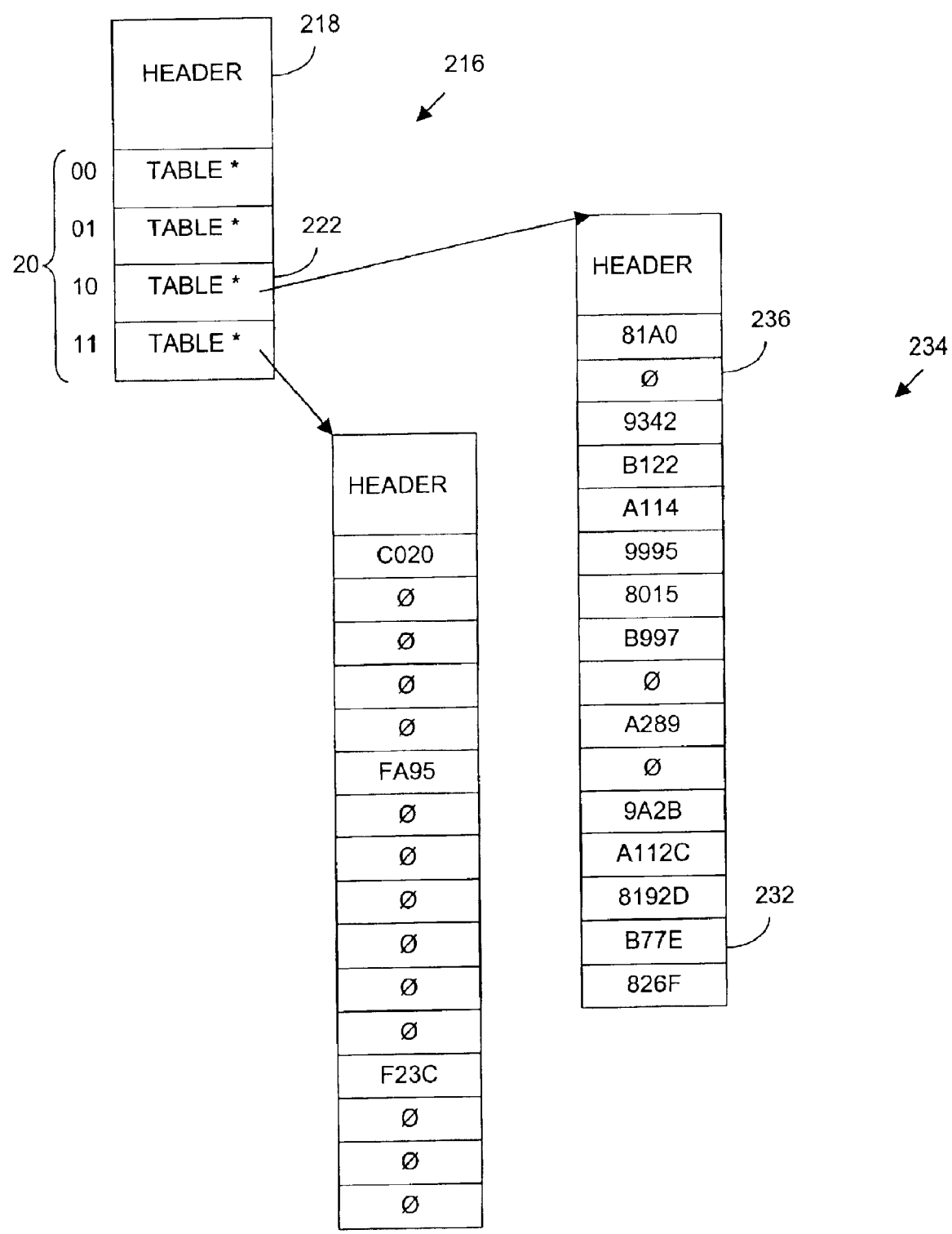
FIG. 15 is a data-structure diagram that illustrates a composite table in which a remembered set can be stored.

In FIG. 15, for example, let us assume that a table data structure 216 includes a header portion 218 and a pointer array 220. Actually, structure 216 is a top-level structure for the remembered set's composite table. Rather than an array of references being stored, it includes a locator array through which the constituent tables can be found. In the illustrated embodiment, the entries of the locator array are simply pointers to the constituent tables, although other embodiments may use other types of entries to locate the constituent tables. The hash-function result, $10_2$, is the index of array slot 222. That slot contains the pointer to the constituent array that is to hold the reference location being memorialized.

Of course, the hash function need not merely be a selection among the bits of the reference's address, but it typically will be. Also, although the selected bits in the example are contiguous, that is not necessary. Additionally, the hash function may be different for different cars. So the table's header may include, say, a mask entry that identifies the bits employed in the (bit-selection) hash function for that table.

The particular choice of hash function is not critical. Hash functions typically are so chosen as to tend to result in an even distribution among the selected items. And the hash-function choice for some embodiments may indeed be made on that basis. But the hash function in the illustrated embodiment, namely, the most-significant bits, was chosen to enable table characteristics to be tailored to those of the memory region where the references memorialized by that table are located. If there is a region of the generation that is more densely populated with references into the car than others are, the intention is that the dense region be dealt with by a constituent table whose characteristics are tailored to that density, while the other constituent tables' characteristics are chosen to deal better with sparser reference contents.

In some embodiments, initial allocation of the composite table's top-level structure 216 is not accompanied by allocation of memory space for a constituent table associated with slot in array 220. So FIG. 14's block 224 represents testing the indexed array to slot to determine whether it contains a valid pointer (rather than, say, a NULL value to indicate that space has not yet been allocated to a corresponding constituent table). If memory space for a corresponding constituent table has not yet been allocated, the collector allocates that space and initializes its contents, as block 226 indicates. To identify the constituent-table slot into which the address of the reference to be memorialized should be written, the collector uses another hash function to compute another index. Again, the hash function will typically be a selection of address bits. For the sake of example, let us assume that the hash function is simply the four least-significant address bits. For address 929E, those bits have the hexadecimal value E, which is the index of, say, slot 232 in the constituent table 234 associated with top-level slot 222.

Also for the sake of example, though, let us assume that slot 232 already contains a valid reference-address pointer. In that case, the collector proceeds circularly or in some other pattern though the constituent table's slots until it finds (1) a slot that already contains the address to be recorded or (2) a slot that contains an empty-slot indicator, such as a NULL value. In the illustrated scenario, it finds such an entry in slot 236.

As FIG. 14's block 238 indicates, the collector then places an entry into the hash table. Typically, it will also increment an entry in the hash table's header (exemplified by header 239 in FIG. 15) to keep track of how many entries have been made so far in that table. In some embodiments, it may also increment an entry in the top-level structure 216's header 218 to update a count representing the total of the entries in all constituent tables. The entry-addition process is then complete.

Now return to FIG. 14's block 224 and assume that the test it represents yields an affirmative result: a valid pointer has already been placed into the top-level slot to which the reference's address hashed. In that case, the collector would follow the thereby-found pointer to the hash table, as block 240 indicates. It would then consult the count value in the constituent table's header, comparing it with a capacity entry in that header to determine whether the table is full. Ordinarily, the table will be considered "full" before all of its slots have been filled. This is the typical behavior of an expandable hash table, because the efficiency of making a hash-table entry decreases severely when very few empty slots are left.

If the constituent hash table is not full, then the collector makes the entry in the manner previously described. Otherwise, the collector needs to make some type of capacity adjustment. For example, the adjustment may simply involve expanding the memory space allocated to the constituent table. To increase the constituent table's memory space, the collector would typically allocate a larger memory block, copy the metadata into the new block, making changes as appropriate to reflect the replacement constituent table's increased capacity and a new hash function, and rehash the existing contents to place them into the new table. If the hash function is, as in the illustrated embodiment, simply a selection of reference-address bits, the new hash function may depend on an additional bit in the reference address, or it may simply be, say, the same bits with a fixed zero bit or fixed one bit at the end.

Another possible adjustment is to coarsen the granularity with which the table's entries represent reference locations.

In the approach to reference-location recording described above in connection with FIG. 15, each reference location results in a separate entry into hash table 234. So the granularity with which that table represents reference locations is a single memory word: an entry represents a region in memory whose size is that of a word. But the granularity can be coarsened so that an entry represents a larger region. In that case, a single entry can represent a plurality of references if they are located in the same region. So all references whose addresses differ only in their least-significant bits would be represented by a common hash-table entry.

To coarsen the granularity, the collector would mask out each entry's least-significant bits. It would also change the bit selection employed for the hash function, possibly by simply shifting the bit selection to the left by the number of bits masked out, and use the resultant hash function to generate the indexes used to place the masked values into the table. While the resultant entries would still represent references' locations, they would do so by specifying respective regions in which the reference could be found; that is, the regions would have to be scanned to find the references.

Block 244 represents the step of deciding among coarsening, represented by block 246, table expansion, represented by block 247, and another option, represented by block 248.

Figure 16:
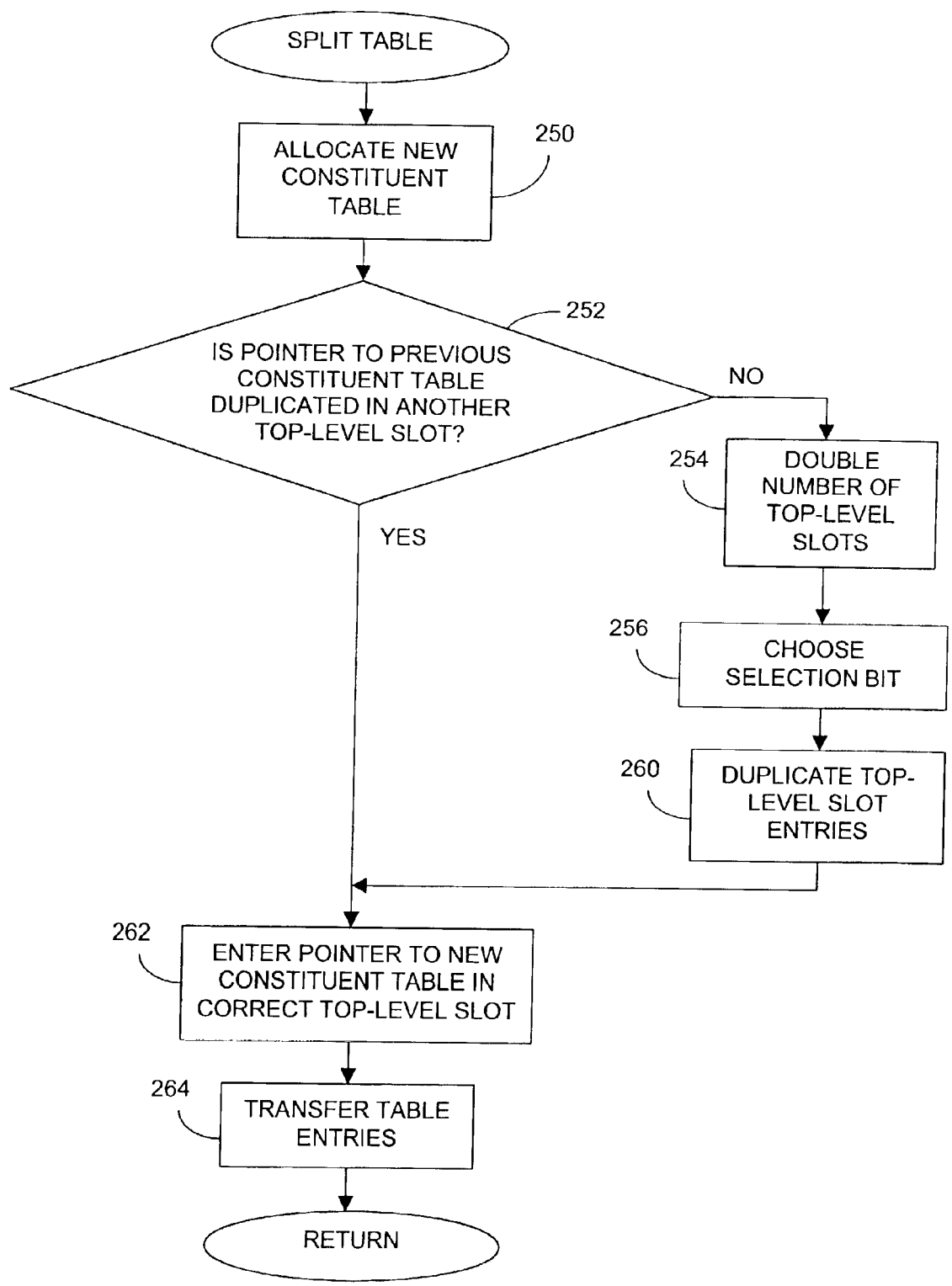
FIG. 16 is a flow chart of a routine for adding a constituent table to a composite table in which a remembered set is stored.

The block-248 option is table splitting. This option is like the table-expansion option in that it adds more room for remembered-set entries. But it does not do so by increasing the number of contiguous slots that constituent table 234 contains. Instead, it involves increasing the number of tables. One way of doing this is to allocate a number of further tables and use the slots in table 234 for pointers to them. In the illustrated embodiment, though, table 234 remains a leaf table, but some of its entries are transferred to a new table. FIG. 16 depicts the operation for doing so.

Block 250 represents allocating the memory for the new constituent table and making appropriate initializing entries into its header. For reasons to be explained below, the collector typically will also allocate a replacement location for the table being split, although the drawing does not reflect this. Also for reasons that will become apparent shortly, the collector then determines, as block 252 indicates, whether the top-level pointer array contains duplicate pointers to the table being split. If not, the collector doubles the (typically small) number of top-level table slots, as block 254 indicates. Each of the resultant (more-numerous) table slots will be associated with a different index in the range of a new hash function whose range is twice that of the previous hash function. In the illustrated embodiment, the increased range is achieved by adding a bit to the bit selection that constitutes the hash function. Since the illustrated embodiment's top-level hash function initially was the two most-significant reference-address bits, the added bit may simply be the next-most-significant bit. Alternatively, the added bit may be selected on a histogram basis to achieve some desired result.

As was mentioned above, hashing is often performed to achieve a relatively even distribution, but in some embodiments the policy may be just the opposite. To appreciate why, return to the decision represented by FIG. 14's block 244, in which one possible outcome is that the constituent table's granularity should be coarsened. Coarsening desirably tends to limit remembered-set size, but the cost of achieving this size reduction is that remembered-set processing during the car's collection is more expensive. Instead of being able to follow the remembered-set entry directly to the reference, the collector must search for the reference throughout the region that the remembered-set entry identifies. So the coarsening is not worthwhile if the region identified by a remembered-set entry contains only a single reference in most cases. And, indeed, references to objects in the collection-set car will tend to be sparse in the train-algorithm-managed generation as a whole.

But if, as is often the case, there are concentrations of such references in small parts of the generation, and if the address of the locations where such concentrations occur tend to hash to the same constituent-table-indicating value, then it is advantageous to coarsen that table's granularity but leave other constituent tables' granularities relatively fine. So choosing a hash function that concentrates a region's references in a given table will enable the collector to maximize the benefit that granularity coarsening affords.

Some collectors may therefore employ this policy in making the selection-bit choice that FIG. 16's block 256 represents. But such policy considerations will be employed more often in making the decision of FIG. 14's block 244. The collector may determine both how much of a reduction in the number of entries coarsening will produce and how skewed a distribution can be obtained by splitting. It may employ a histogram for the latter determination. To expedite a determination of whether coarsening will be productive, approximate methods such as the use of a Bloom filter may be employed.

In the Bloom-filter approach, a small number of hash functions having a common range are applied to each of the coarsened values. A bit array that includes a respective bit corresponding to each value in the hash functions' common range has a bit set for each resultant output. If, for example, five hash functions are employed and a given coarsened value is applied to each, potentially five different bits in the array will be set, one for each hash-function output. If every bit thereby to be set in response to a single coarsened value has already been set in response to the previous values, the same value has probably (but not necessarily) been encountered before. By counting the number of such probable matches, the collector can estimate how much savings in remembered-set space a given coarsening will cause. If coarsening does not reduce the number of entries enough but splitting significantly skews the distribution between the two tables that result from the split, then the table may be split on the theory that a subsequent coarsening of the constituent table that receives most of the entries is likely to be more helpful.

Figure 17:
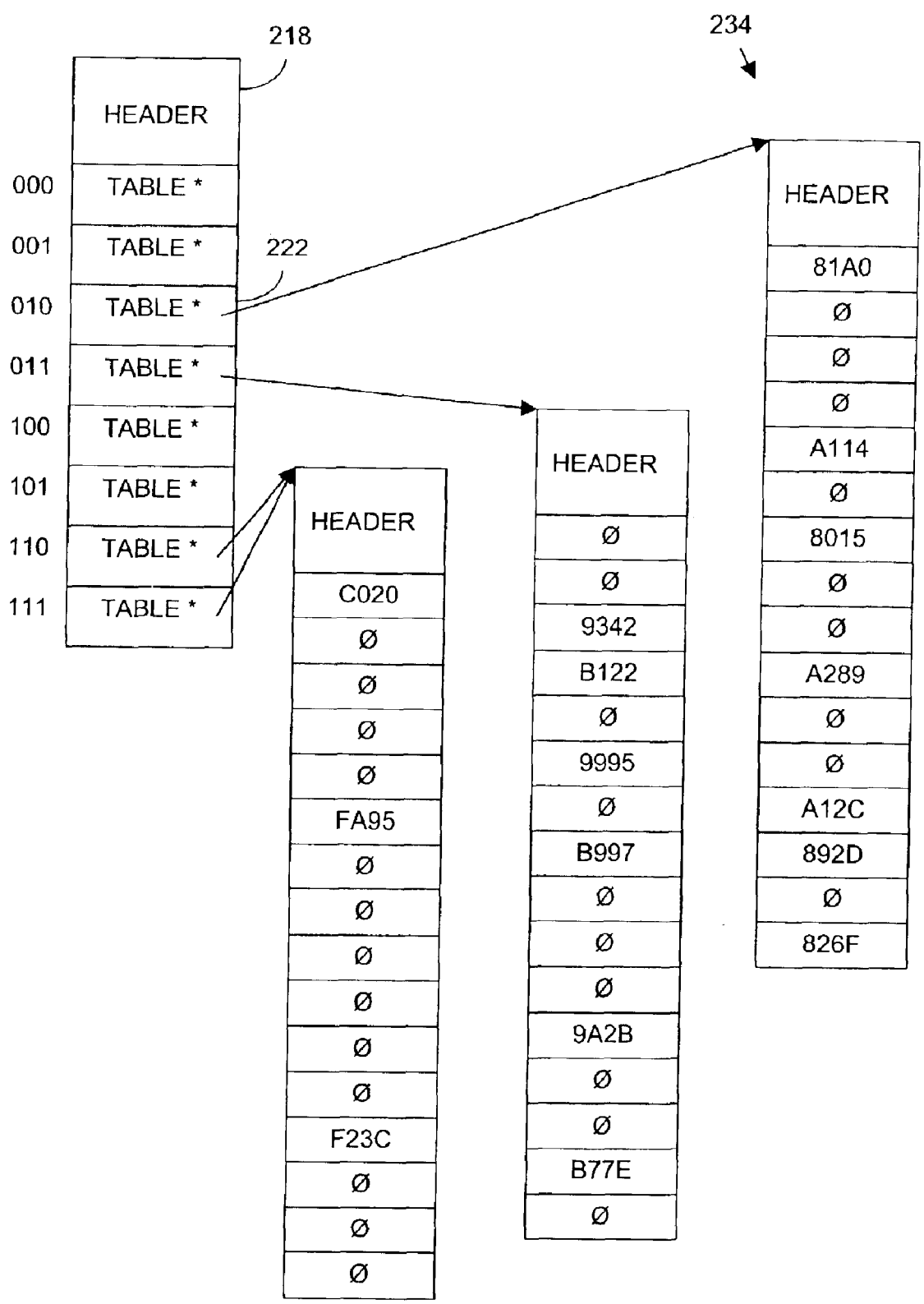
FIG. 17 is a data-structure diagram that illustrates adding a constituent table to the composite table of FIG. 15.

In any event, the step represented by FIG. 16's block 256 results in a new top-level hash function, and the slots in the top-level structure 216 are filled in accordance with that function. Since the new hash function has twice the range, some of the reference addresses in a given table that was not split will hash to an index value different from others in the same table. The contents of the top-level-structure slots identified by those indexes should be the same, though, and block 260 represents making those duplicate entries. For the entries in the block being split, on the other hand, the different indexes that the hash function produces should identify slots containing two different pointers, one to the original constituent table and the other to the constituent table that receives the entries removed from it, as FIG. 17 illustrates. Block 262 represents making those entries in the top-level table. Block 264 represents redistributing the split table's previous entries between it and the new table in accordance with the top-level hash function and placing the entries in the constituent tables' slots in accordance with those tables' respective hash functions.

Block 250 represents allocating the memory for the new constituent table and making appropriate initializing entries into its header. With the new constituent table thus initialized, the collector re-hashes the table contents and transfers some of the table entries from the original constituent table to the new constituent table in accordance with the results.

It is partially because of this re-hashing that the block-250 step typically includes allocating memory for two constituent tables; each entry can be placed immediately into its new location without waiting for the previous occupant to be removed. Additionally, the new constituent tables need not be equal in size to the table being split.

The reason for the test that block 256 represents can now be appreciated. If a constituent table is to be split after another one already has been, the top-level table may contain duplicate pointers to the constituent table to be split. If so, the top-level array does not need to be expanded; the operation that block 262 represents consists of simply replacing one of those duplicate pointers with a pointer to the new constituent table.

Reflection reveals that the technique of employing constituent arrays can be extended to more than one level of pointer array. That is, some or all of the array slots in the top-level array could point to lower-level pointer arrays, whose members would point to constituent tables or even lower-level pointer arrays: some of the constituent tables could themselves be composite tables. More typically, though, there will be only a single level of pointer array, since the size to which the top-level pointer array is likely to expand will not be very great in most systems.

In any event, thus dividing the remembered set into a plurality of constituent arrays yields a number of benefits. As was explained above, it tends to maximize the advantages of granularity coarsening by restricting it to parts of the heap where it does the most good. Also, the amount of memory allocated to a remembered set tends to fit the remembered set's size more closely. And the use of a plurality of hash tables for a single remembered set facilitates work sharing in multi-threaded systems. This advantage results even if the technique is employed in an embodiment that never splits constituent tables and therefore never employs a number of constituent tables greater than the initial number of slots in the top-level pointer array.

So the invention can be practiced in a wide range of embodiments and thus constitutes a significant advance in the art.

What is claimed is:

1. A method of employing a computer system, which includes memory including a heap in which space is dynamically allocated, to reclaim in at least a generation of the heap the memory space not occupied by objects identified as potentially reachable, wherein the method includes:

A) treating the generation as divided into car sections;
   B) repeatedly scanning at least portions of the generation for references into the car sections;
   C) maintaining for each of at least one of the car sections a respective remembered set of remembered-set entries that identify locations at which references to objects in that car section have thereby been found, the remembered-set entries in at least one said remembered set being contained in a respective composite table that is associated with that remembered set and includes a locator array and a plurality of constituent tables that contain the remembered-set entries and whose locations are identified by entries in the locator array; and
   D) using the remembered-set entries to identify potentially reachable objects in at least some of the car sections.

2. A method as defined in claim 1 that further includes determining whether a given said constituent table meets predetermined splitting criteria and, if so, adding at least one constituent table to the component table to which that constituent table belongs.

3. A method as defined in claim 1 wherein:
   A) the locator array includes a plurality of locator-array slots, with which different slot indexes are respectively associated, that contain the entries in the locator array;
   B) the slot indexes are the range of a top-level hash function to whose domain the remembered-set entries belong; and
   C) the only remembered-set entries contained in any said constituent table are those to which application of the top-level hash function results in the index of a said locator-array slot whose entry identifies that constituent table.

4. A method as defined in claim 3 that further includes determining whether a given said constituent table meets predetermined splitting criteria and, if so, adding at least one constituent table to the component table to which that constituent table belongs.

5. A method as defined in claim 4 wherein, if it is determined that a given said constituent table meets the predetermined splitting criteria and only one entry in the locator array identifies the given constituent table, the method further includes:
   A) changing the top-level hash function to increase its range;
   B) so increasing the number of locator-array slots in the locator array as to associate a different locator-array slot with every index in the range of the top-level hash function as thus changed;
   C) placing an entry identifying each constituent table in at least one of the resultant locator-array slots; and
   D) transferring remembered-set entries among the constituent tables to the extent necessary to leave each constituent table with only those remembered-set entries to which application of the top-level hash function results in the index of a said locator-array slot whose entry identifies that constituent table.

6. A method as defined in claim 3 wherein:
   A) a respective lower-level hash function is associated with each constituent table;
   B) each constituent table includes a plurality of constituent-table array slots, with which different slot indexes are respectively associated and in which the remembered-set entries contained by that constituent table are stored; and
   C) application of that lower-level hash function to the remembered set entry contained in a constituent-table array slot results in the index of that constituent-table array slot.

7. A method as defined in claim 1 wherein none of the constituent tables is also a composite table.

8. A method as defined in claim 1 wherein the entries in the locator array are pointers to respective constituent tables.

9. A computer system comprising:
   A) processor circuitry operable to execute processor instructions; and
   B) memory circuitry, to which the processor circuitry is responsive, that includes a heap in which memory space is dynamically allocated and that contains processor instructions readable by the processor circuitry to configure the computer system as a garbage collector that:

i) treats at least a generation of the heap as divided into car sections;
ii) repeatedly scans at least portions of the generation for references into the car sections;
iii) maintains for each of at least one of the car sections a respective remembered set of remembered-set entries that identify locations at which references to objects in that car section have thereby been found, the remembered-set entries in at least one said remembered set being contained in a respective composite table that is associated with that remembered set and includes a locator array and a plurality of constituent tables that contain the remembered-set entries and occupy locations identified by entries in the locator array;
iv) identifies potentially reachable objects in the car sections in operations that, in the case of each car section with which a remembered set is associated, includes using the remembered-set entries in the associated remembered set to identify the potentially reachable objects; and
v) reclaims the memory space not occupied by objects thereby identified as potentially reachable.

10. A computer system as defined in claim 9 wherein the garbage collector additionally determines whether a given said constituent table meets predetermined splitting criteria and, if so, adds at least one constituent table to the component table to which that constituent table belongs.

11. A computer system as defined in claim 9 wherein:
A) the locator array includes a plurality of locator-array slots, with which different slot indexes are respectively associated, that contain the entries in the locator array;
B) the slot indexes are the range of a top-level hash function to whose domain the remembered-set entries belong; and
C) the only remembered-set entries contained in any said constituent table are those to which application of the top-level hash function results in the index of a said locator-array slot whose entry identifies that constituent table.

12. A computer system as defined in claim 11 wherein the garbage collector additionally determines whether a given said constituent table meets predetermined splitting criteria and, if so, adds at least one constituent table to the component table to which that constituent table belongs.

13. A computer system as defined in claim 12 wherein, if the garbage collector determines that a given said constituent table meets the predetermined splitting criteria and only one entry in the locator array identifies the given constituent table, it further:
A) changes the top-level hash function to increase its range;
B) so increases the number of locator-array slots in the locator array as to associate a different locator-array slot with every index in the range of the top-level hash function as thus changed;
C) places an entry identifying each constituent table in at least one of the resultant locator-array slots; and
D) transfers remembered-set entries among the constituent tables to the extent necessary to leave each constituent table with only those remembered-set entries to which application of the top-level hash function results in the index of a said locator-array slot whose entry identifies that constituent table.

14. A computer system as defined in claim 11 wherein:
A) a respective lower-level hash function is associated with each constituent table;
B) each constituent table includes a plurality of constituent-table array slots, with which different slot indexes are respectively associated and in which the remembered-set entries contained by that constituent table are stored; and
C) application of that lower-level hash function to the remembered set entry contained in a constituent-table array slot results in the index of that constituent-table array slot.

15. A computer system as defined in claim 9 wherein none of the constituent tables is also a composite table.

16. A computer system as defined in claim 9 wherein the entries in the locator array are pointers to respective constituent tables.

17. A storage medium containing instructions readable by a computer system, which includes memory including a heap in which space is dynamically allocated, to configure the computer system to operate as a garbage collector that:
A) treats at least a generation of the heap in the memory as divided into car sections;
B) repeatedly scans at least portions of the generation for references into the car sections;
C) maintains for each of at least one of the car sections a respective remembered set of remembered-set entries that identify locations at which references to objects in that car section have thereby been found, the remembered-set entries in at least one said remembered set being contained in a respective composite table that is associated with that remembered set and includes a locator array and a plurality of constituent tables that contain the remembered-set entries and occupy locations identified by entries in the locator array;
D) identifies potentially reachable objects in the car sections in operations that, in the case of each car section with which a remembered set is associated, includes using the remembered-set entries in the associated remembered set to identify the potentially reachable objects; and
E) reclaims the memory space not occupied by objects thereby identified as potentially reachable.

18. A storage medium as defined in claim 17 wherein the garbage collector additionally determines whether a given said constituent table meets predetermined splitting criteria and, if so, adds at least one constituent table to the component table to which that constituent table belongs.

19. A storage medium as defined in claim 17 wherein:
A) the locator array includes a plurality of locator-array slots, with which different slot indexes are respectively associated, that contain the entries in the locator array;
B) the slot indexes are the range of a top-level hash function to whose domain the remembered-set entries belong; and
C) the only remembered-set entries contained in any said constituent table are those to which application of the top-level hash function results in the index of a said locator-array slot whose entry identifies that constituent table.

20. A storage medium as defined in claim 19 wherein the garbage collector additionally determines whether a given said constituent table meets predetermined splitting criteria and, if so, adds at least one constituent table to the component table to which that constituent table belongs.

21. A storage medium as defined in claim 20 wherein, if the garbage collector determines that a given said constituent table meets the predetermined splitting criteria and only one entry in the locator array identifies the given constituent table, it further:
A) changes the top-level hash function to increase its range;

B) so increases the number of locator-array slots in the locator array as to associate a different locator-array slot with every index in the range of the top-level hash function as thus changed;

C) places an entry identifying each constituent table in at least one of the resultant locator-array slots; and D) transfers remembered-set entries among the constituent tables to the extent necessary to leave each constituent table with only those remembered-set entries to which application of the top-level hash function results in the index of a said locator-array slot whose entry identifies that constituent table.

22. A storage medium as defined in claim 19 wherein:

A) a respective lower-level hash function is associated with each constituent table;

B) each constituent table includes a plurality of constituent-table array slots, with which different slot indexes are respectively associated and in which the remembered-set entries contained by that constituent table are stored; and C) application of that lower-level hash function to the remembered set entry contained in a constituent-table array slot results in the index of that constituent-table array slot.

23. A storage medium as defined in claim 17 wherein none of the constituent tables is also a composite table.

24. A storage medium as defined in claim 17 wherein the entries in the locator array are pointers to respective constituent tables.

25. An electromagnetic signal representing sequences of instructions that, when executed by a computer system, cause it to operate as a garbage collector that:

A) treats at least a generation of the heap in the memory as divided into car sections;

B) repeatedly scans at least portions of the generation for references into the car sections;

C) maintains for each of at least one of the car sections a respective remembered set of remembered-set entries that identify locations at which references to objects in that car section have thereby been found, the remembered-set entries in at least one said remembered set being contained in a respective composite table that is associated with that remembered set and includes a locator array and a plurality of constituent tables that contain the remembered-set entries and occupy locations identified by entries in the locator array;

D) identifies potentially reachable objects in the car sections in operations that, in the case of each car section with which a remembered set is associated, includes using the remembered-set entries in the associated remembered set to identify the potentially reachable objects; and E) reclaims the memory space not occupied by objects thereby identified as potentially reachable.

26. An electromagnetic signal as defined in claim 25 wherein the garbage collector additionally determines whether a given said constituent table meets predetermined splitting criteria and, if so, adds at least one constituent table to the component table to which that constituent table belongs.

27. An electromagnetic signal as defined in claim 25 wherein:

A) the locator array includes a plurality of locator-array slots, with which different slot indexes are respectively associated, that contain the entries in the locator array;

B) the slot indexes are the range of a top-level hash function to whose domain the remembered-set entries belong; and C) the only remembered-set entries contained in any said constituent table are those to which application of the top-level hash function results in the index of a said locator-array slot whose entry identifies that constituent table.

28. An electromagnetic signal as defined in claim 27 wherein the garbage collector additionally determines whether a given said constituent table meets predetermined splitting criteria and, if so, adds at least one constituent table to the component table to which that constituent table belongs.

29. An electromagnetic signal as defined in claim 28 wherein, if the garbage collector determines that a given said constituent table meets the predetermined splitting criteria and only one entry in the locator array identifies the given constituent table, it further:

A) changes the top-level hash function to increase its range;

B) so increases the number of locator-array slots in the locator array as to associate a different locator-array slot with every index in the range of the top-level hash function as thus changed;

C) places an entry identifying each constituent table in at least one of the resultant locator-array slots; and D) transfers remembered-set entries among the constituent tables to the extent necessary to leave each constituent table with only those remembered-set entries to which application of the top-level hash function results in the index of a said locator-array slot whose entry identifies that constituent table.

30. An electromagnetic signal as defined in claim 27 wherein:

A) a respective lower-level hash function is associated with each constituent table;

B) each constituent table includes a plurality of constituent-table array slots, with which different slot indexes are respectively associated and in which the remembered-set entries contained by that constituent table are stored; and C) application of that lower-level hash function to the remembered set entry contained in a constituent-table array slot results in the index of that constituent-table array slot.

31. An electromagnetic signal as defined in claim 25 wherein none of the constituent tables is also a composite table.

32. An electromagnetic signal as defined in claim 25 wherein the entries in the locator array are pointers to respective constituent tables.

33. A garbage collector comprising:

A) means for treating at least a generation of a heap where a computer system's memory is dynamically allocated as divided into car sections;

B) means for repeatedly scanning at least portions of the generation for references into the car sections;

C) means for maintaining for each of at least one of the car sections a respective remembered set of remembered-set entries that identify locations at which references to objects in that car section have thereby been found, the remembered-set entries in at least one said remembered set being contained in a respective composite table that is associated with that remembered set and includes a locator array and a plurality of constituent tables that contain the remembered-set entries and occupy locations identified by entries in the locator array;

D) means for identifying potentially reachable objects in the car sections in operations that, in the case of each car section with which a remembered set is associated, includes using the remembered-set entries in the associated remembered set to identify the potentially reachable objects; and E) means for reclaiming the memory space not occupied by objects thereby identified as potentially reachable.

* * * * *